US009775368B2

(12) United States Patent
McGill et al.

(10) Patent No.: US 9,775,368 B2
(45) Date of Patent: Oct. 3, 2017

(54) CONTAINER WITH OUTLET

(71) Applicant: McGill Technology Limited, Coventry (GB)

(72) Inventors: Shane Robert McGill, Kent (GB); Martin White, Kent (GB)

(73) Assignee: MCGILL TECHNOLOGY LIMITED, Kent (GB)

( * ) Notice: Subject to any disclaimer, the term of this patent is extended or adjusted under 35 U.S.C. 154(b) by 52 days.

(21) Appl. No.: 14/787,386

(22) PCT Filed: May 16, 2014

(86) PCT No.: PCT/GB2014/051512
§ 371 (c)(1),
(2) Date: Oct. 27, 2015

(87) PCT Pub. No.: WO2014/184579
PCT Pub. Date: Nov. 20, 2014

(65) Prior Publication Data
US 2016/0165920 A1      Jun. 16, 2016

(30) Foreign Application Priority Data

May 16, 2013 (GB) .................................. 1308810.9
Jan. 13, 2014 (GB) .................................. 1400505.2

(51) Int. Cl.
B67D 1/00          (2006.01)
A23G 9/28          (2006.01)
(Continued)

(52) U.S. Cl.
CPC ............. *A23G 9/285* (2013.01); *A23G 9/228* (2013.01); *B29C 45/0053* (2013.01);
(Continued)

(58) Field of Classification Search
CPC .... A23G 9/285; A23G 9/228; B29C 45/0053; B29C 45/0081; B65D 85/78; B65D 35/02
(Continued)

(56) References Cited

U.S. PATENT DOCUMENTS 5,456,294 A      10/1995   Tsao et al.
2004/0238576 A1*  12/2004   McGill .................. A23G 9/285
                                                        222/495
(Continued)

FOREIGN PATENT DOCUMENTS

DE      44 06 162        8/1995
JP      2011-062102      3/2011
(Continued)

OTHER PUBLICATIONS

PCT International Search Report dated Aug. 7, 2014 issued in PCT International Patent Application No. PCT/GB2014/051512, 3 pp.
(Continued)

*Primary Examiner* — Lien Ngo
(74) *Attorney, Agent, or Firm* — Nixon & Vanderhye P.C.

(57) ABSTRACT

This invention relates to containers of the kind having an outlet through which product is to be dispensed, e.g. food product. There is provided a container for product to be dispensed. The container has an upper part intended to move or deform in order to reduce the volume within the container. The container has an outlet intended to open during movement or deformation of said upper part. The outlet comprises a plurality of movable parts. The outlet further comprises a plurality of fixed parts located between said movable parts. The movable and fixed parts are arranged for shaping product as it is dispensed from the container through the outlet. A method of dispensing and a vending machine for dispensing portions of ice cream or other frozen product from the container are also provided.

21 Claims, 22 Drawing Sheets

(51) Int. Cl.
  *B65D 83/00* (2006.01)
  *B65D 47/20* (2006.01)
  *B65D 85/78* (2006.01)
  *B29C 45/14* (2006.01)
  *B29C 45/26* (2006.01)
  *B29C 45/00* (2006.01)
  *A23G 9/22* (2006.01)

(52) U.S. Cl.
  CPC ...... *B29C 45/0055* (2013.01); *B29C 45/0081* (2013.01); *B29C 45/14336* (2013.01); *B29C 45/2628* (2013.01); *B65D 47/2031* (2013.01); *B65D 83/0094* (2013.01); *B65D 85/78* (2013.01); *B29C 2045/0056* (2013.01)

(58) Field of Classification Search
  USPC ....... 222/52, 95, 240, 491–497, 575, 146, 6, 222/92, 146.6
  See application file for complete search history.

(56) References Cited

U.S. PATENT DOCUMENTS

2006/0255066 A1* 11/2006 Kannar .................. A23G 9/045
  222/145.3
2009/0127287 A1* 5/2009 Faller ..................... A23G 3/28
  222/107
2009/0242589 A1* 10/2009 Berthelin ........... B65D 47/2031
  222/494

FOREIGN PATENT DOCUMENTS

| WO | WO 94/13154 | 6/1994 |
| WO | WO 96/01224 | 1/1996 |
| WO | WO 02/102170 | 12/2002 |
| WO | WO 03/010062 | 2/2003 |
| WO | WO 2008/052802 | 5/2008 |
| WO | WO 2009/056792 | 5/2009 |
| WO | WO 2011/036477 | 3/2011 |

OTHER PUBLICATIONS

English Translation of Japanese Office Action dated Dec. 15, 2015 issued in Japanese Patent Application No. 2015-516690, 4 pp.

Great Britain Search Report dated Oct. 22, 2014 issued in Great Britain Patent Application No. 1408728.2, 4 pp.

* cited by examiner

CONTAINER WITH OUTLET

This application is the U.S. national phase of International Application No. PCT/GB2014/051512 filed May 16, 2014 which designated the U.S. and claims priority to Great Britain Patent Application No. 1308810.9 filed May 16, 2013 and Great Britain Patent Application No. 1400505.2 filed Jan. 13, 2014, the entire contents of each of which are hereby incorporated by reference.

FIELD OF THE INVENTION

This invention relates to containers of the kind having an outlet through which product is to be dispensed, e.g. food product.

BACKGROUND OF THE INVENTION

It is known, from previous applications such as WO96/01224 and WO94/13154, to provide containers from which food product, particularly ice cream or other frozen confections e.g. sorbet, frozen yoghurt, can be extruded through an outlet whose cross-section is less than the cross-section of the container. Reducing the internal volume of the container can be done in a range of different ways, such as deforming the container or by using a piston inside the container. The containers have an outlet through which product is discharged and the outlet shapes the product during discharge.

Conventionally, the containers are provided with a protective sticker placed over the outlet in order to protect the product from the outside environment. This protective sticker is removed prior to the container being placed in the dispensing machine and the product being dispensed. It is desirable to provide an alternative to a protective sticker, and preferably provide a container which is compatible with existing dispensing machines.

Previous application WO03/010062 provides a container with displaceable parts which can move from a closed position to an open position to define an outlet of the container.

However, there can be difficulties when moulding or operating such containers.

The present invention aims to overcome or mitigate the problems associated with the prior art.

SUMMARY OF THE DISCLOSURE

According to one aspect, there is provided a container for product to be dispensed. The container has an upper part intended to move or deform in order to reduce the volume within the container. The container has an outlet intended to open during movement or deformation of said upper part. The outlet comprises a plurality of movable parts. The outlet further comprises a plurality of fixed parts located between said movable parts. The movable and fixed parts are arranged for shaping product as it is dispensed from the container through the outlet.

The use of moving and fixed parts to define the outlet simplifies the moulding of the containers, and has been found to provide improved operation of the outlet in use, i.e. with less tendency for one or more of the movable parts to resist movement to an open position.

In exemplary embodiments, the outlet may define a star-shaped opening.

In exemplary embodiments, the movable parts comprise a free end, distal the hinge, the free end comprising an end surface, the movable parts further comprising at least one side surface, wherein the end surface of a first movable part and the side surface of a second movable part are adjacent when the outlet is in a closed condition. In exemplary embodiments, the end surface is shorter than the length of the hinge. In exemplary embodiments, the end surface is shorter than the length of said side surface.

In exemplary embodiments, the movable parts are hingedly coupled with the container. The hinge may comprise a groove. The groove may have at least one internal radius. The groove may have two internal radii. The hinge may be defined by a groove which defines an open channel, having opposing walls and a transition wall therebetween. The joint between said walls may define a radius. The hinge may have a thickened area in relation to the remainder of the hinge. There may be a thickened area at or adjacent to one or both ends of the hinge lengthways.

In exemplary embodiments, the movable parts comprise a free end, distal the hinge, the free end comprising an end surface, the movable parts further comprising at least one side surface, wherein at least a part of the side surface of a first movable part may be in abutment or proximal the end surface of a second movable part when the outlet is in a closed condition.

In exemplary embodiments, the movable parts include a projection on an internal surface, configured to help create the desired shape of product during dispensing.

In exemplary embodiments, the container may further comprise at least one locking mechanism configured to retain the movable parts in a closed position with a retaining force until a predetermined pressure is reached within the container. The locking mechanism may be a tab configured to retain the movable parts in the closed position until the product is dispensed. The tab may be located on the fixed parts, and arranged to engage the movable part when the outlet is in a closed condition. The movable parts may be configured to overcome the retaining force of the locking mechanism and move to an open position when a predetermined pressure is reached within the container. The locking mechanism may be configured to deform in order to permit the movable parts to move to an open position when a predetermined pressure is reached within the container.

In alternative embodiments, the outlet of the container includes a membrane after manufacture of the container, configured to retain the movable parts in a closed position with a retaining force until the membrane is broken.

Advantageously, the membrane allows product to be hermetically sealed within the container until dispensing is desired.

The membrane may be located between the fixed and movable parts of the outlet and between adjacent movable parts, such that when the membrane is broken, the movable parts are free to move to an open position.

The membrane may be formed of thinner material than the fixed parts of the outlet, such that, in use, the membrane breaks and the fixed parts remain unbroken, e.g. by modifying a mould used to manufacture the container accordingly.

The outlet may be surrounded by a retaining wall projecting from an underside of the container.

In exemplary embodiments, one or more of the fixed parts includes a rib on an underside thereof.

Advantageously, the provision of a rib strengthens the fixed parts such that, in use, they have increased resistance to the force generated by the pressure of the product as it is dispensed. This is particularly advantageous in the embodiments that include the membrane, as the increased strength of the fixed parts compared to the strength of the membrane helps to safeguard against the fixed parts also breaking when the membrane is broken.

In exemplary embodiments, the movable parts are biased towards the closed position such that when the dispensing pressure is released, the outlet closes.

Advantageously, the biasing of the movable parts helps to 'cut off' the flow of product when a dispensing operating is complete.

According to a second aspect, there is provided a container for product to be dispensed, the container having an outlet through which product may be dispensed from the container, the outlet comprising a plurality of movable parts, each movable between a closed position and an open position, and wherein a wall projects from an underside of the container, said wall being arranged for limiting the movement of said movable parts.

Advantageously, the wall prevents the movable parts from overextending during a dispensing operation. This helps to ensure the desired shape of the outlet is maintained and reduces the risk of the movable parts breaking off.

In exemplary embodiments, the wall is annular to said outlet, e.g. defining a ring around the axis of dispensing. In exemplary embodiments, the wall is continuous. In exemplary embodiments, an inner surface of the wall is parallel to the axis of dispensing (i.e. parallel with the central axis of the outlet).

In exemplary embodiments, the outlet is configured to shape product during a dispensing operation from the container.

In exemplary embodiments, the outlet includes fixed parts, e.g. the outlet may consist of three fixed parts and three movable parts. In exemplary embodiments, the outlet define a generally star-shaped opening when the movable parts are in the open position. The movable parts may include a projection on an internal surface configured to create the desired shape of product e.g. a star shape.

In exemplary embodiments, an inner surface of each movable part includes two angled surfaces which meet at an apex.

In exemplary embodiments, the container is formed with a recess in the outer surface thereof.

The container may further comprise at least one locking mechanism configured to retain the movable parts in the closed position with a retaining force until a predetermined pressure is reached within the container. The movable parts may be configured to overcome the retaining force of the locking mechanism and move to the open position when a predetermined pressure is reached within the container. The locking mechanism may be configured to deform in order to permit the movable parts to move to the open position when a predetermined pressure is reached within the container. The locking mechanism may be a tab configured to retain the movable parts in the closed position until the product is dispensed. The tab may be located on the fixed parts, and arranged to engage the movable part when the outlet is in the closed condition.

In alternative embodiments, the outlet of the container includes a membrane after manufacture of the container, configured to retain the movable parts in a closed position with a retaining force until the membrane is broken.

The membrane may be located between the fixed and movable parts of the outlet and between adjacent movable parts, such that when the membrane is broken, the movable parts are free to move to an open position. The membrane may be formed of thinner material than the fixed parts of the outlet, such that, in use, the membrane breaks and the fixed parts remain unbroken.

In exemplary embodiments, one or more of the fixed parts includes a rib on an underside thereof.

Advantageously, the provision of a rib strengthens the fixed parts such that, in use, they have increased resistance to the force generated by the pressure of the product as it is dispensed. This is particularly advantageous in the embodiments that include the membrane, as the increased strength of the fixed parts compared to the strength of the membrane helps to safeguard against the fixed parts also breaking when the membrane is broken.

In exemplary embodiments, the movable parts are hingedly coupled with the container. The hinge may comprise a groove. The groove may have at least one internal radius. The groove may have two internal radii. The hinge may be defined by a groove which defines an open channel, having opposing walls and a transition wall therebetween. The joint between said walls may define a radius. The hinge may have a thickened area in relation to the remainder of the hinge. There may be a thickened area at or adjacent to one or both ends of the hinge lengthways.

In exemplary embodiments, the movable parts are biased towards the closed position.

The container may further comprise an upper part, intended to move or deform to reduce the internal volume of the container and cause the movable parts to move to the open position.

According to a third aspect, there is provided a method of dispensing, comprising the steps of producing the container of the first or second aspect, moulding the container with the movable parts in an open position, displacing the movable parts to a closed position after moulding, and providing at least one locking mechanism to retain the movable parts in the closed position with a retaining force until a predetermined force is applied to the movable parts.

This simplifies the moulding operation compared to previous methods, reducing the cost of manufacture, as well as removing the need to provide a removable sticker or the like on the container outlet to help contain the product.

In exemplary embodiments, the movable parts are configured to overcome the retaining force of the locking mechanism and move to an open position when a predetermined pressure is reached within the container (i.e. when a threshold force applied to the movable parts has been exceeded).

The locking mechanism may deform in order to allow the movable parts to move to an open position when a predetermined pressure is reached within the container.

The locking mechanism may be a tab that retains the movable parts in the closed position with the retaining force after completion of the moulding process. The tab may be located on the fixed parts, arranged to engage the movable part when the outlet is in the closed condition.

According to a fourth aspect, there is provided a dispensing assembly comprising a plurality of containers according to the second aspect, and a dispensing machine comprising a seating for receiving one of said containers and supporting said container for a dispensing operation, and a dispensing mechanism for applying a force to said container when received in the seating for a dispensing operation, wherein the seating includes a recess or aperture having a diameter greater than the wall which projects from the underside of the container.

Therefore, during a dispensing operation, the wall provides a barrier between the outlet of the container and the seating of the dispensing machine, helping to prevent product from transferring to the seating during a dispensing operation, making the machine more hygienic and reducing the need for a user to clean the dispenser after each operation.

The dispensing mechanism may comprise a plunger or other movable part intended to contact and deform the container, decreasing the internal volume within the container, thereby increasing pressure within the container, in order to cause product to be expressed through the outlet of the container.

According to a fifth aspect, a mechanism is provided for opening a container of the first or second aspect including a membrane between the fixed and movable parts of the outlet, the mechanism comprising a cup-shaped recess that generally corresponds to the profile of the underside of the container, wherein the recess includes a slot, groove, depression or channel in a bottom surface that corresponds to a projecting wall on an underside of the container, and wherein the recess defines a projection inboard of said slot, groove, depression or channel, such that, in use, when one of said containers is placed into the mechanism and a force is applied to a top surface of the container, a bottom half of the container sits in the recess, and a wall of the container projects into the slot, groove, depression or channel, such that the membrane is broken by the projection, freeing the movable parts of the outlet to move to an open position.

According to a sixth aspect, there is provided a method of opening a container of the first or second aspect including a membrane between the fixed and movable parts of the outlet, the method comprising placing the container into the mechanism of the fifth aspect and applying a force to a top surface of the container such that the outlet of the container engages the projection of the mechanism, breaking the membrane of the container.

In alternative embodiments, there is provided a method of opening a container of the first or second aspect including a membrane between the fixed and movable parts of the outlet, the method comprising securing the container in place and applying a force to the outlet of the container, breaking the membrane of the container and freeing the movable parts of the outlet to move to an open position.

According to a seventh aspect, there is provided a method of performing a dispensing operation, comprising inserting a container of the first or second aspect that includes a membrane between the fixed and movable parts of the outlet into a seating, applying a force to the container to break the membrane, freeing the movable parts of the outlet to move to an open position, and applying a force to the container to dispense product through the outlet.

In exemplary embodiments, the method comprises moving the container to a dispensing location after the step of breaking the membrane and before applying a force to the container to dispense product.

In exemplary embodiments, the container is moved to a breaking location after the container is inserted into the seating, before a force is applied to the container to break the membrane.

In exemplary embodiments, a force is applied to an outlet of the container to break the membrane. In exemplary embodiments, the outlet of the container is forced onto a projection in order to break the membrane.

In exemplary embodiments, a force is applied to a top surface of the container to dispense product through the outlet of the container.

In exemplary embodiments, the method further comprises disposing of the container after product has been dispensed, e.g. wherein the container is moved from a dispensing location to a disposal location, in order to be disposed of.

According to an eighth aspect, there is provided a dispensing apparatus for dispensing portions of ice cream or other frozen confection from a container of the first or second aspect including a membrane between the fixed and movable parts of the outlet, wherein the dispensing apparatus comprises a storage area for storing a plurality of said containers, and a dispensing location having a seating for receiving one of said stored containers from said storage area, a dispensing head for applying a load to the container in order to dispense product through the outlet of the container, further wherein the dispensing apparatus comprises a breaking mechanism for use in breaking a membrane at the outlet of the container prior to the application of load to the container via the dispensing head.

In exemplary embodiments, the dispensing apparatus comprises a first actuator for applying a load to the outlet to break the membrane, and a second actuator for applying a load to the container to dispense product.

In exemplary embodiments, the second actuator is arranged for applying a load to an upper surface of the container.

In exemplary embodiments, the dispensing apparatus includes a mechanism for disposing of the container after a dispensing operation, e.g. to remove the container from the seating and transfer the container to a disposal area.

In exemplary embodiments, the seating is one of a plurality of seatings provided on a rotatable drum configured for translating a container between a plurality of locations, e.g. from at least a first location to a second location.

In exemplary embodiments, a force is applied to the outlet of the container to break the membrane at the first location of the container, whereas load is applied to the container for a dispensing operation at the second location.

In exemplary embodiments, the drum can be rotated to translate a container from the second location to a third location, where the container is disposed of.

In alternative embodiments, the container is received in the seating at the first location (e.g. having been delivered from said storage area), the membrane is broken at said second location, dispensing occurs at a third location, and the container is disposed of from the seating at a fourth location.

In exemplary embodiments, the storage area comprises a magazine of containers, the magazine arranged to locate the bottommost container adjacent the first location, such that a container, containing product, can be transferred to the seating of the drum at the first location, when desired.

In exemplary embodiments, the new container is transferred from the magazine to the seating of the drum at the first location using a suction mechanism. In alternative embodiments, the new container is transferred from the magazine to the seating of the drum at the first location by mechanical release of the container from the magazine.

In exemplary embodiments, the magazine can store a plurality of stacks of containers containing product, the magazine movable such that a depleted stack can be replaced with another stack.

In exemplary embodiments, the plurality of stacks of the magazine are arranged on a rotatable carousel such that when a stack is depleted, the carousel can be rotated to provide another stack of containers.

In exemplary embodiments, the carousel is arranged above the drum, at least one stack being arranged to be substantially coaxial with the seating of the drum at the first location, e.g. so a container can drop from the carousel to the seating of the drum at the first location.

In exemplary embodiments, the dispensing apparatus is a vending machine, comprising a user interface for a user to select product to be dispensed, and a processor configured for automating a dispensing operation according to a user selection via said user interface, e.g. by delivering a container of product from said storage location, using said breaking mechanism to break the outlet membrane and then using the dispensing head to apply a load to the container in order to dispense product from said outlet.

BRIEF DESCRIPTION OF THE DRAWINGS

Embodiments of the disclosure are described with reference to the accompanying drawings, in which.

DETAILED DESCRIPTION OF EMBODIMENT(S)

Figure 1:
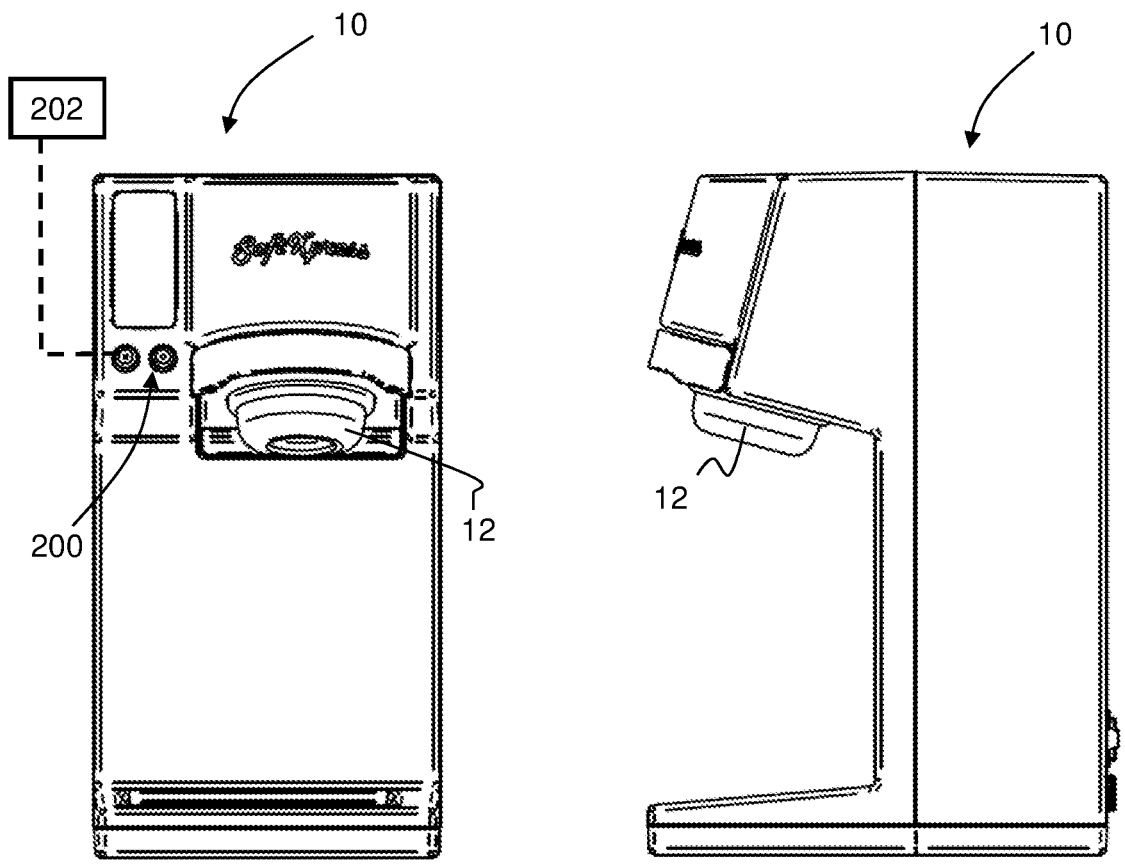
FIG. 1 is a front and side view of an dispensing machine of the prior art.

Referring firstly to FIG. 1, and an ice cream dispenser is indicated generally at 10. The dispenser 10 includes a seating 12 configured to receive a container of product to be dispensed. The dispenser 10 is configured to apply a load to a container received on the seating 12, in order to extrude product from the container.

The dispenser 10 is of the kind described in WO2011/036477, although other forms of suitable dispenser are known in the art, e.g. as marketed under the trade mark ONE SHOT.

Figure 2:
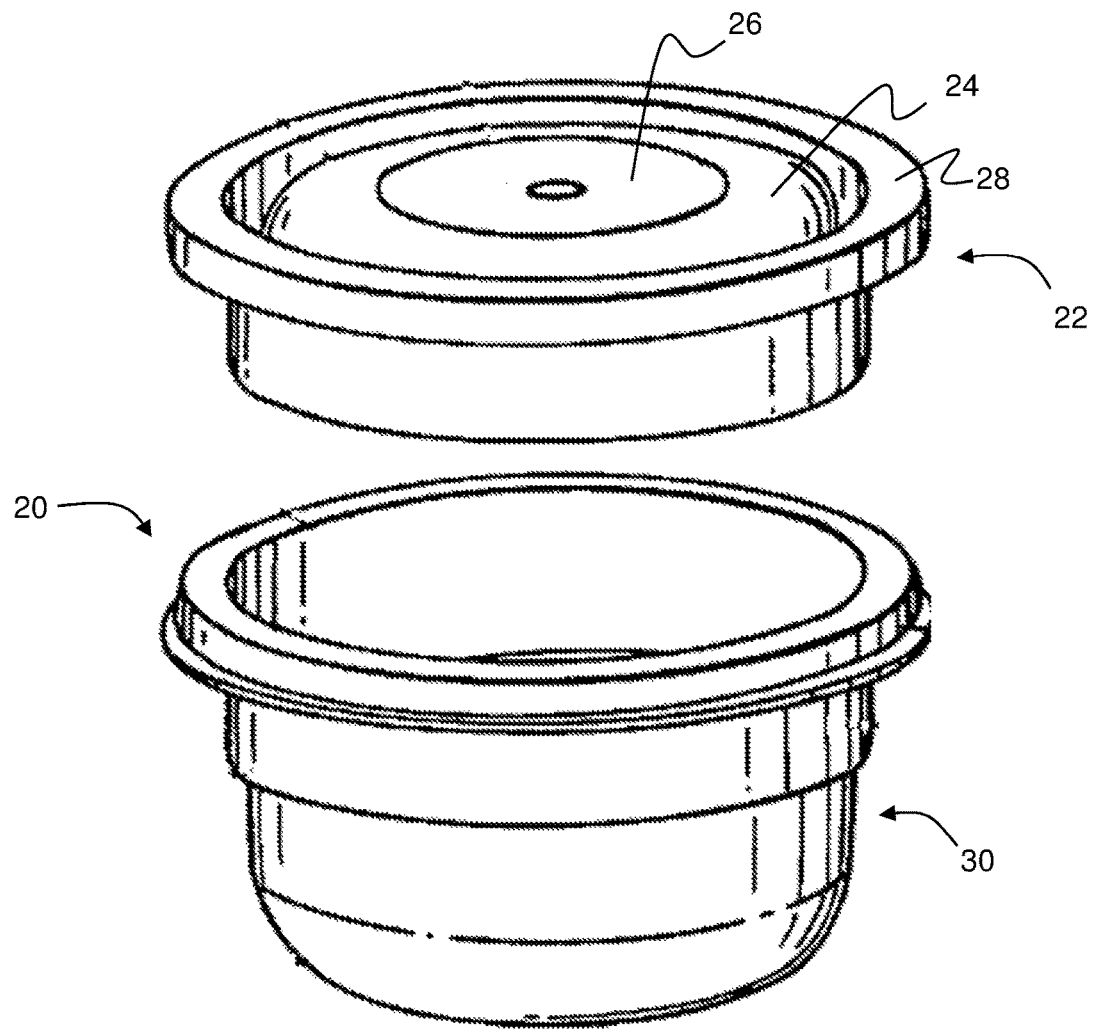
FIG. 2 is a perspective view of a container for dispensing food product.
Figure 3:
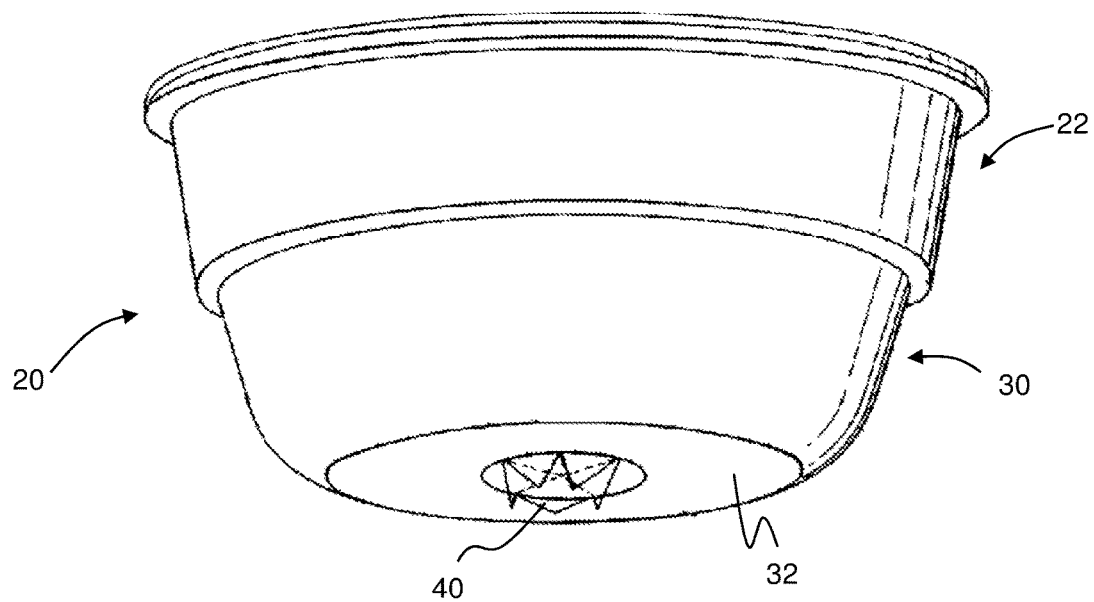
FIG. 3 is a perspective view from a different angle of the container of FIG. 2.

An example of a container suitable for use in the dispenser 10 is indicated generally at 20 in FIGS. 2 and 3. The container 20 has an upper part 22 and a lower part 30. The upper part 22 has a deformable section 24 with an upper surface 26, and a flange 28 for locating the container on a seating 12 of the dispenser. The lower part 30 is configured to nest in the seating 12, and includes a flat base 32 at its lowest point. The base 32 is circular and has an outlet 40 at its centre.

Typically, in use, a plunger within the dispenser is used to push against the upper surface 26 of the deformable section 24, causing it to move inwardly, thereby reducing the internal volume of the container 20. This action causes product to be extruded through the outlet 40.

Figure 4:
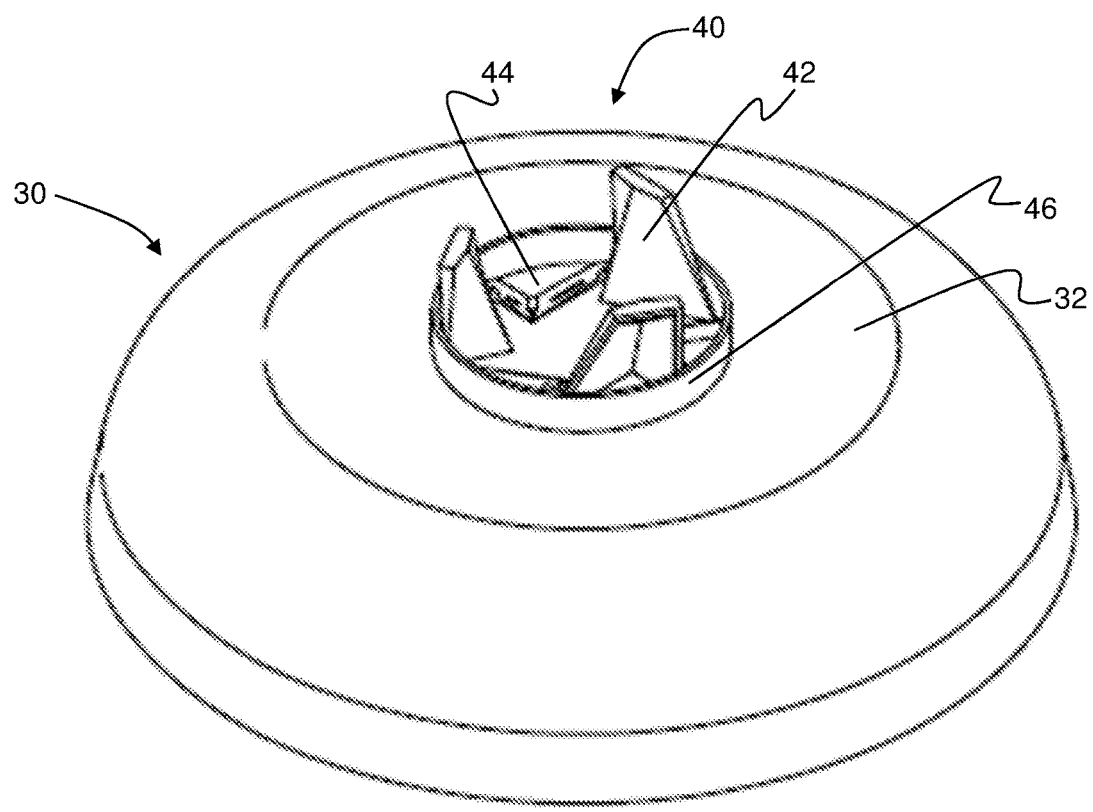
FIG. 4 is a perspective view of only the lower part of a container for dispensing food product, showing the outlet in an open condition.

FIG. 4 shows the underside of the lower part 30 of a container 10 for use with the apparatus FIG. 1, according to an embodiment of the invention, in which the outlet is defined by a plurality of parts 42, 44. As will be described in more detail below, the parts 42 are movable between open and closed positions, whereas the parts 44 are not hinged but are instead intended to remain fixed in a 'closed' position (e.g. extending orthogonally to a central through axis of the outlet).

Figure 6:
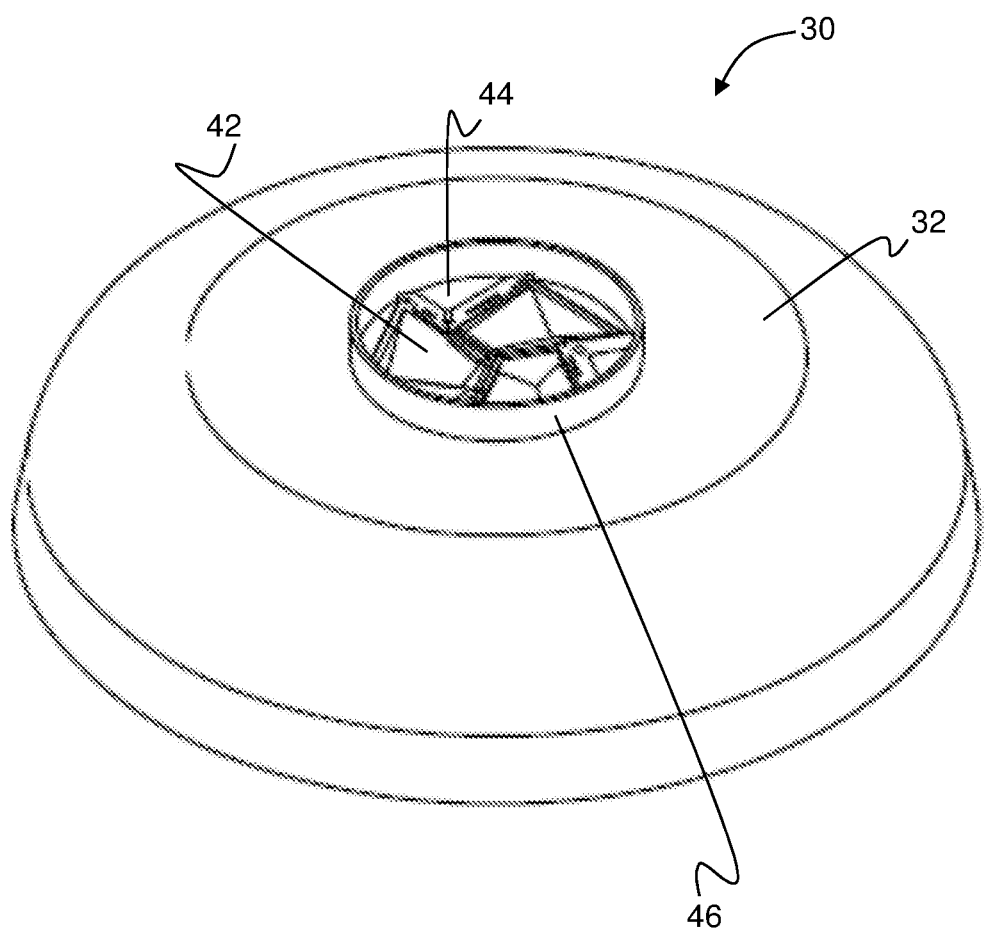
FIG. 6 is similar to FIG. 4, showing the outlet in a closed condition.

Accordingly, the outlet 40 has an open and a closed condition, for dispensing and storing ice cream respectively. In FIG. 4, the outlet 40 is shown in an open condition, wherein the movable parts 42 are in an open position. In FIG. 6, the outlet 40 is shown in a closed condition, wherein the movable parts 42 are in a closed position.

The movable parts 42 are hinged such that they can be displaced outwardly from the lower container part 30 to an open position, e.g. as illustrated in FIG. 4. The movable parts 42 are naturally biased towards the closed position.

As will be described in more detail below, each movable part 42 has a complex shape, with multiple advantages.

In the open condition, product is shaped as it is dispensed through the outlet 40. In particular, the movable and fixed parts 42, 44 cooperate to shape product as it is dispensed through the outlet 40.

Figure 9:
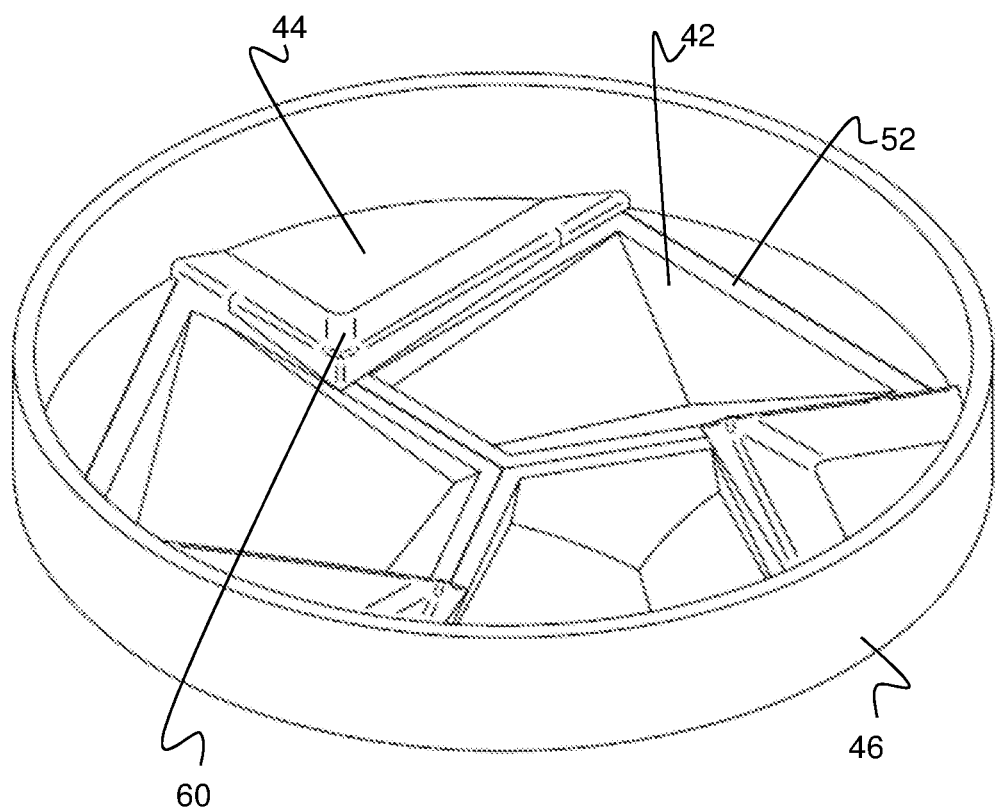
FIG. 9 is similar to FIG. 8, showing the outlet in a closed condition as it would be immediately after one method of assembly.

In the closed condition, each fixed part 44 partially overlaps its adjacent movable parts 42, to provide a retaining force against movement of the movable parts from their closed position, e.g. as shown in FIG. 9. More particularly, the fixed parts 44 have a tab 60 formed thereon to be elastically deformable, such that the tab 60 may deform in order to permit the movable parts 42 to pass when a predetermined force is applied to displace the movable parts 42 from the closed to open position, or vice versa, e.g. they 'snap over' the tab on the fixed parts 44 when the retaining force is overcome by the predetermined force during dispensing.

A continuous wall 46 projects from the underside of the container 10. The wall 46 defines a ring around the outlet 40, co-axial with the outlet 40. It projects in a perpendicular direction to the flat base 32 of the lower container part 30, i.e. with an inner surface of the wall extending parallel to the central axis of the outlet 40. The wall 46 prevents the movable parts 42 from overextending, reducing the risk of the movable parts 42 breaking off during a dispensing operation. The wall 46 may cooperate with the movable parts 42 helping them to form a desired shape of the outlet 40 in an open condition.

Figure 5:
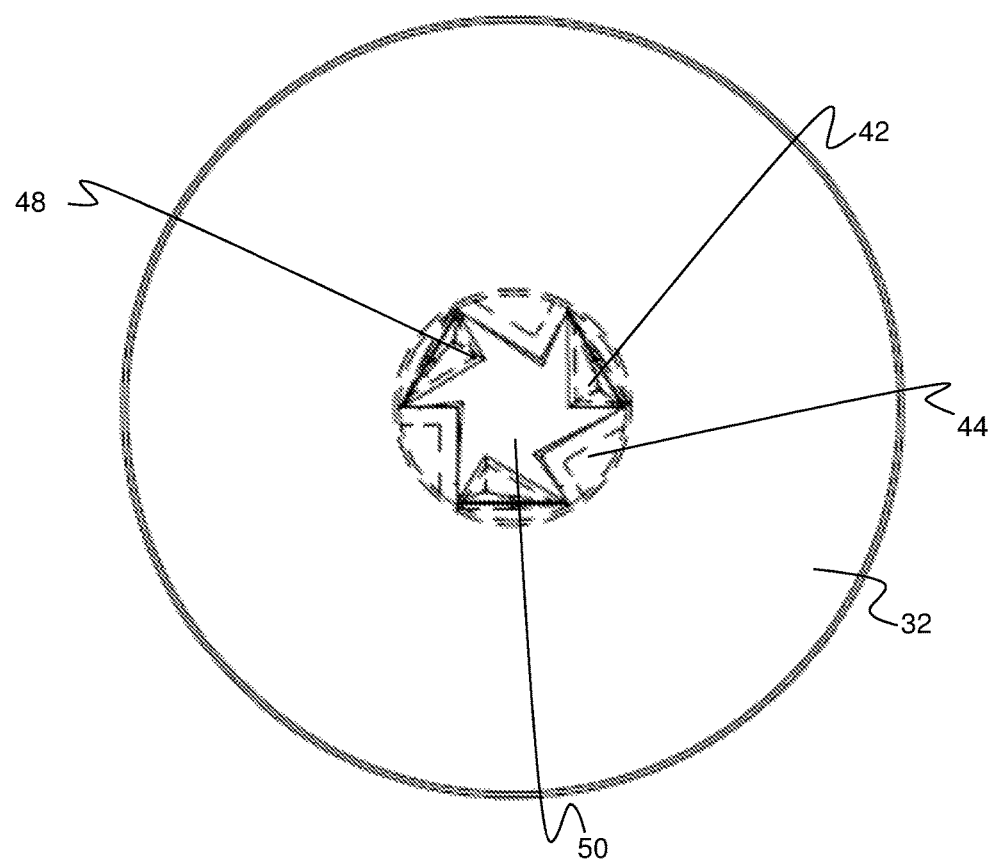
FIG. 5 is a plan view of the container of FIG. 4, showing the outlet in an open condition.

FIG. 5 shows a plan view of the lower container part 30 when the outlet 40 is in the open condition. It can be seen how the positioning and shape of the movable parts 42 and the fixed parts 44 creates a generally star-shaped opening 50.

The fixed parts 44 of the outlet 40 are generally triangular having two free sides when the outlet is in an open configuration. In the embodiment of FIGS. 4 to 10, the free sides are of unequal length, i.e. defining one short free side 45 and one long free side 47. The short free sides 45 extend radially with respect to a central axis of the outlet 40.

Each movable part 42 is moulded with a recess in its outer surface, such that a projection 48 is created on an inner surface of each movable part. When the movable parts 42 are located in the open position, the projections 48 extend into the outlet 40, and—in combination with the triangular shape of the fixed parts 44 (extending in a direction parallel and coincident with the flat base 32)—serve to create the star-shaped opening 50, as can be see clearly from FIGS. 4, 5 and 10.

FIG. 6 shows the lower container part 30 with the outlet 40 in a closed condition. The movable parts 42 are in the closed position, wherein the tab 60 of each fixed part 44 overlaps each movable part 42, retaining the movable parts 42 in the closed position with a retaining force.

Figure 7:
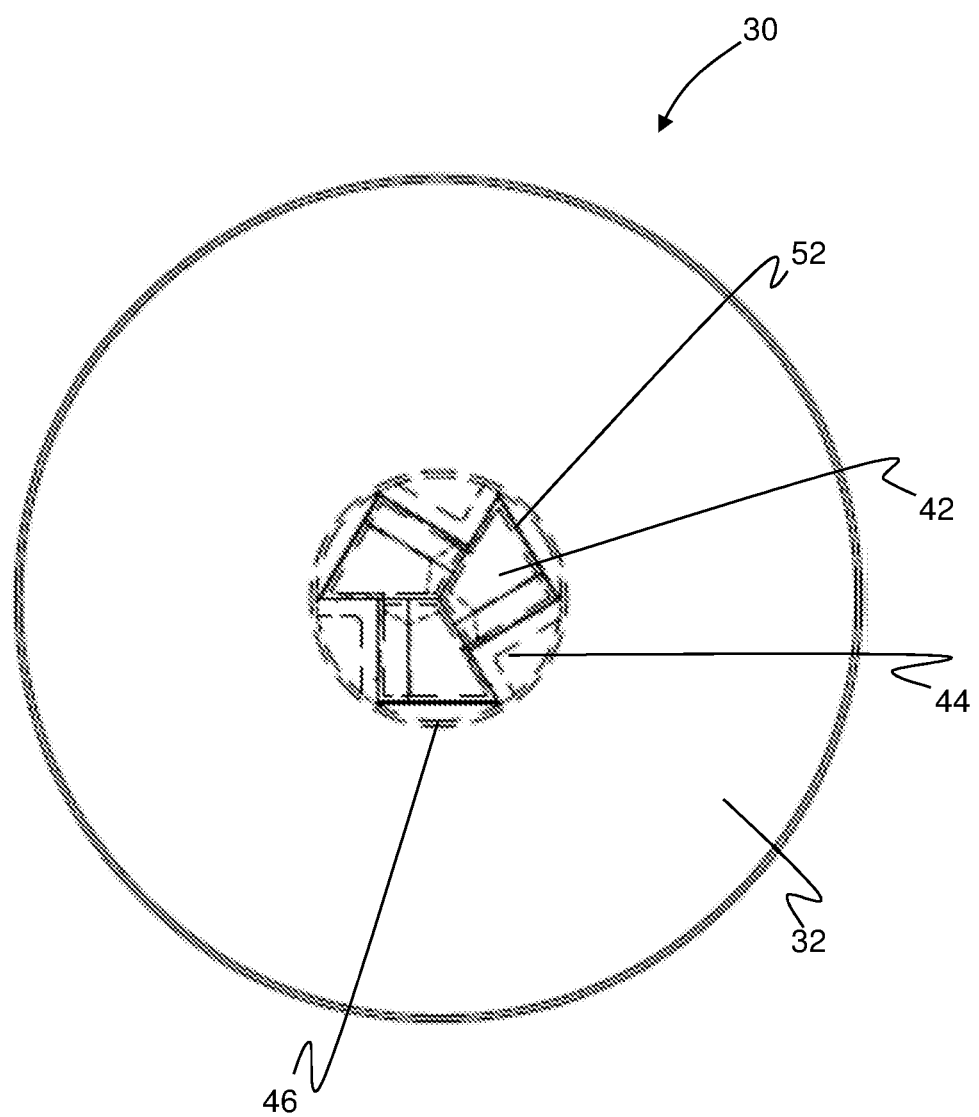
FIG. 7 is similar to FIG. 5, showing the outlet in a closed condition.

FIG. 7 shows a plan view of the lower container part 30 with the outlet 40 in a closed condition. Here, the outline profile of the movable parts 42 and fixed parts 44 can be seen most clearly. As mentioned above, a hinge 52 (described in more detail below) couples the movable parts 42 to the base 32. The hinge 52 permits the movable parts 42 to move between open and closed positions.

Each movable part 42 has a free end 54, distal the hinge 52. The free end 54 has a planar end surface 56 (shown more clearly in FIG. 8). The end surface 56 is shorter in length than the hinge 52. The end surface 56 is parallel with the hinge 52.

Each movable part 42 has two free sides 58, 59 extending from the free end 54 to the hinge 52. The two free sides 58, 59 are of unequal length, defining one long free side 58 and one short free side 59. The two free sides 58, 59 of the movable parts 42 define a planar surface having a wedge-shaped profile, as can be seen most clearly from FIG. 10.

The long free side 58 of each movable part 42 extends at an acute angle between the hinge 52 and the end surface 56, and extends radially with respect to a central axis of the outlet 40. The end surface 56 is shorter in length than the long side 58. The short free side 59 of each movable part 42 extends between the hinge 52 and the end surface 56 in a direction perpendicular to the hinge 52. The short free side 59 is longer than the end surface 56.

It can be seen from the plan view of FIG. 7 that when the outlet 40 is in the closed condition, a portion of the long side 58 of a first movable part 42 is adjacent the end surface 56 of a second movable part 42. Moreover, a portion of the sides 58, 59 of the movable parts 42 is also adjacent respective sides of the fixed parts 44 of the outlet 40. The short free side 58 of the movable parts 42 is substantially the same length and the long free side of the fixed parts 44.

Advantageously, the combination of long and short sides of the movable and fixed parts has been found to provide an improved seal within the container 10 when the outlet 40 is in the closed condition, and also assists in a desirable shape-forming configuration, for the ice cream being dispensed through the outlet 40.

Figure 8:
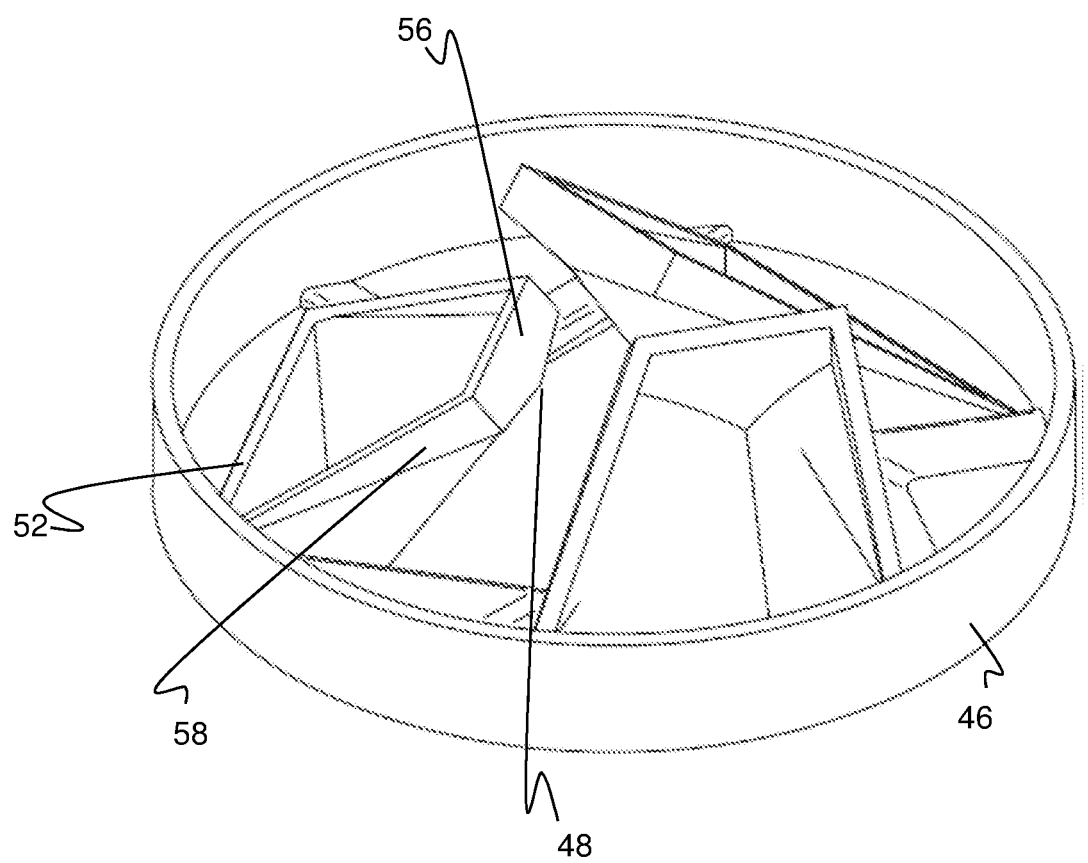
FIG. 8 is a close up perspective view of the outlet of FIGS. 4 to 7, in a partially open condition, as it would be immediately after one method of moulding.

FIG. 8 shows the outlet 40 in a partially open condition. The shape of the end surface 56 and the side surface 58 of the movable parts 42 can clearly be seen. The shape of the projection 48 can also be seen, this shape helping to create the generally star-shaped opening 50 when the outlet 40 is in the open condition.

FIG. 9 shows the outlet in the closed condition. It can be seen more clearly how the fixed part 44 has a tab 60 on its inner edge. The tab 60 has a rounded outside surface. The tab 60 is elastically deformable when a predetermined force is applied to it.

Figure 10:
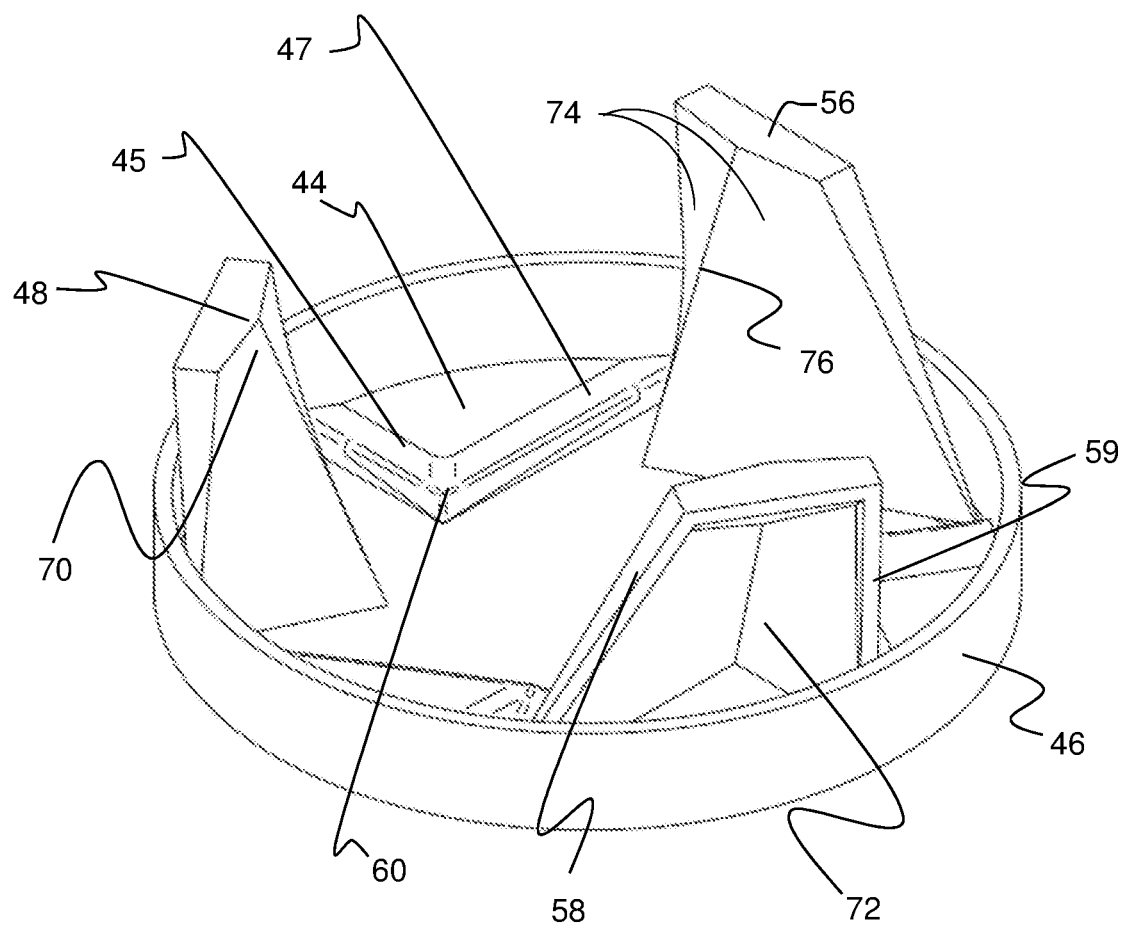
FIG. 10 is similar to FIG. 8 and FIG. 9, showing the outlet in an open condition as it would be during a dispensing operation.

FIG. 10 shows the outlet in the open condition. In the open condition, the movable parts 42 are prevented from excessive movement by the wall 46. It shows clearly that the movable parts 42 have an inner face 70 arranged to project inwardly of the container in the closed position (formed by the recess on the outer face 72). More particularly, the inner face 70 of each movable part 42 includes two angled surfaces 74 which meet at an apex 76.

Figure 11:
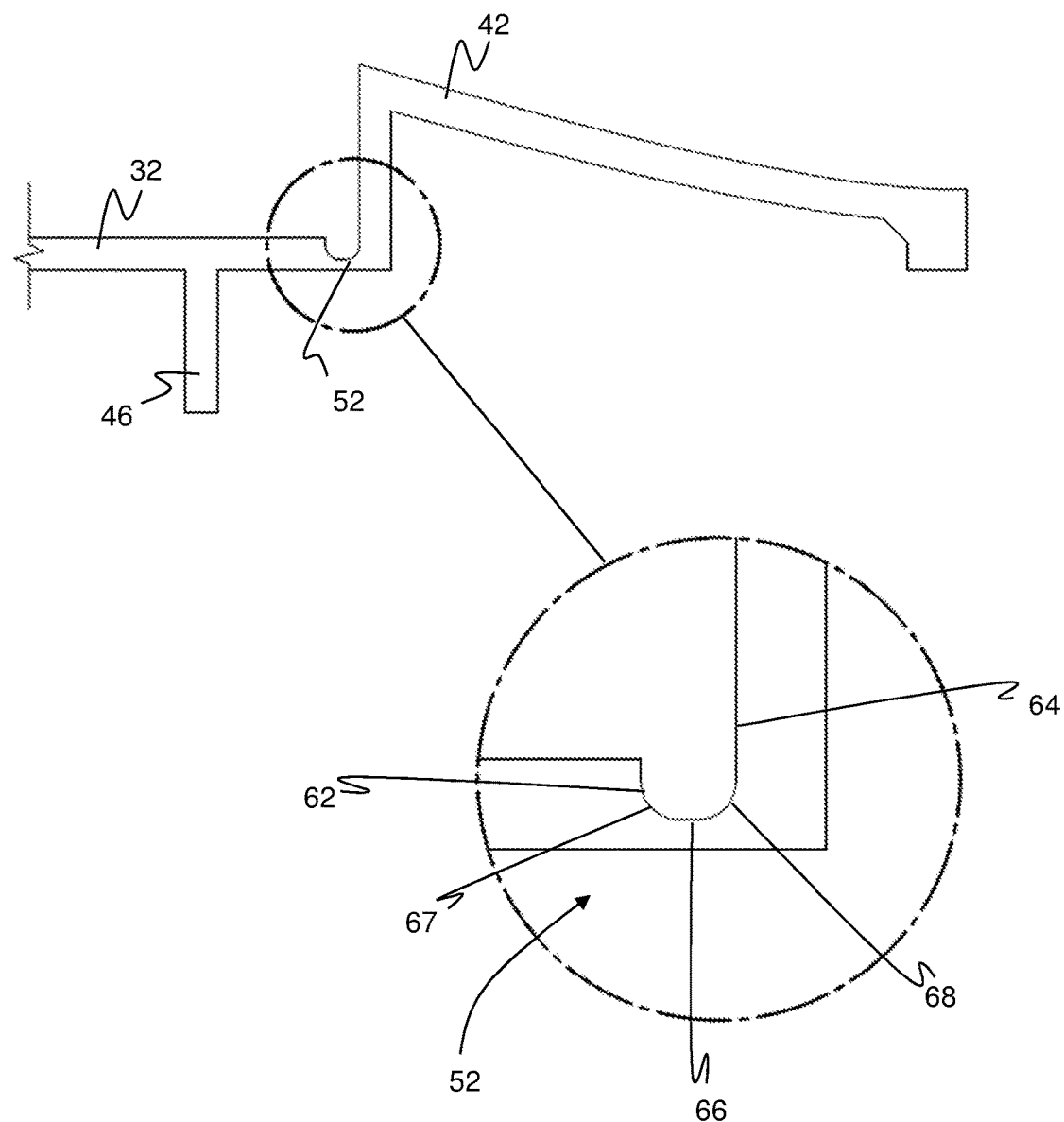
FIG. 11 is a cross-sectional view of the lower part of a container for dispensing food product, showing a detailed view of a hinge for a movable part of the outlet.

FIG. 11 shows a detailed cross section of the hinge 52. The hinge 52 is a groove located between the base 32 and the movable part 42. The groove defines a channel having a radially outer surface 62 and a radially inner surface 64. Connecting the outer and inner surfaces 62, 64 is a base or joint 66. The joint 66 is of reduced cross-section, enabling the hinge to flex. The transition between the outer surface 62 and the joint 66 defines a radius 67, and the transition between the inner surface 64 and the joint 66 defines a radius 68. This configuration has been found to promote flexure of the hinge without splitting during movement of the movable part from a closed to open position.

Although not shown in the figures, to further discourage splitting, the thickness of the hinge 52 may also vary along its length. For example at either end, adjacent the fixed parts 44, it may have an increased thickness e.g. the joint 66 may have an increased depth at either end of the hinge. This would advantageously increase the strength of the hinge at its end regions and minimise the risk of tearing along the hinge 52.

The container 20 is manufactured by injection moulding. It is moulded with the outlet 40 in a partially open condition as illustrated in FIG. 8. The movable parts 42 are then moved to the closed position. This can be done manually or automatically immediately following the moulding operation. The movable parts 42 are retained in the closed position by the tabs 60 located on the fixed parts 44.

In use, the container 20 is placed in the seating 12 of an appropriate dispenser such as the one illustrated in FIG. 1. Upon the application of an extrusion force, e.g. via a plunger or like device on the dispenser, the internal volume within the container 20 is decreased, thereby increasing the internal pressure. At a predetermined pressure, the retaining force of the tabs 60 is overcome. The tabs 60 elastically deform allowing the movable parts 42 to move to the open position. The outlet 40 is therefore in an open condition, creating a star-shaped opening 50. Product extrudes through the outlet 40. The product takes the shape of the opening 50 as it passes through, so has a star-shaped cross-section as it exits the outlet 40.

During the operation, the wall 46 prevents the movable parts 42 from overextending, keeping the star-shape as desired and reducing the risk of the movable parts 42 breaking off during the operation. At the end of the operation, the natural bias of the movable parts 42 towards the closed position helps to cut off the stream and 'crimp' the product.

The diameter of the wall 46 is lower than the diameter of a recess (not shown) in the seating 12 of the dispensing machine 10. The wall 46 advantageously provides a barrier between the outlet 40 and the seating 12, preventing product from transferring to the seating 12 during dispensing, making the machine more hygienic and reducing the need for a user to clean the dispenser after each operation.

The container 20 is nestable with other containers of the same dimensions and the same type so that they can be filled with product on high-speed filling machines. A base support may be required to apply pressure against the assembled sections whilst the product is being filled and the lid is applied and closed.

It will be appreciated that further variations can be made without departing from the scope of the invention. For example, the tabs 60 could be in a different location such as attached to the wall 46 or the movable parts 42.

Figure 12:
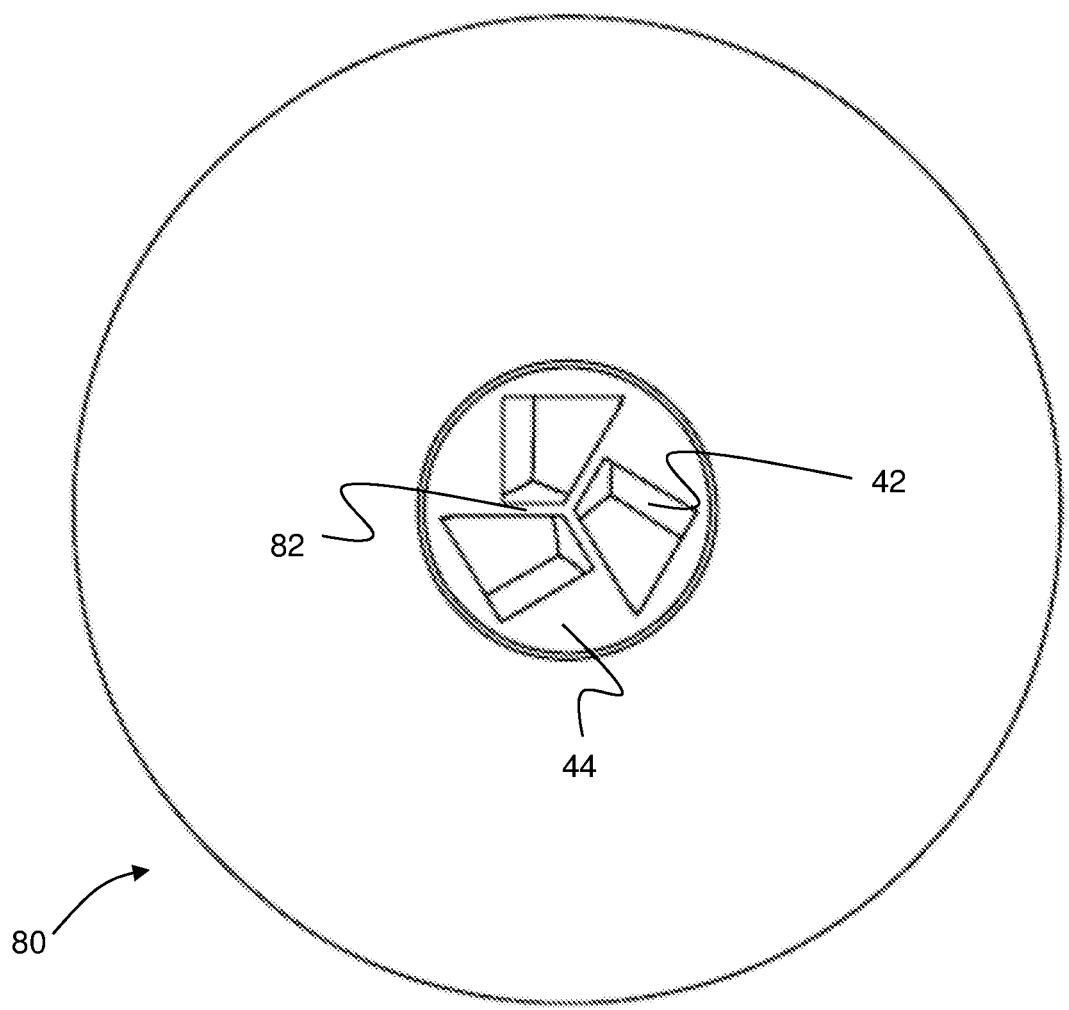
FIG. 12 is similar to FIG. 7, showing a plan view from the underside of another container for dispensing product, with the outlet in a closed condition immediately after moulding.

FIG. 12 shows a plan view from the underside of another container 80, which is substantially the same as the container of FIGS. 2-11, but is moulded with the outlet in a closed condition. A land 82 is formed between the movable parts 42. The land 82 is of a reduced material thickness, suitable to form a line of weakness capable of breaking under typical extrusion pressures for the product in question. Each land 82 is a continuation of a line of weakness (formed by a region of reduced material thickness) extending between the movable and fixed parts 42, 44. Hence, the outlet is moulded closed, and is capable of breaking open during a dispensing operation, in order to adopt a configuration as shown in FIGS. 4 & 10.

Figure 13:
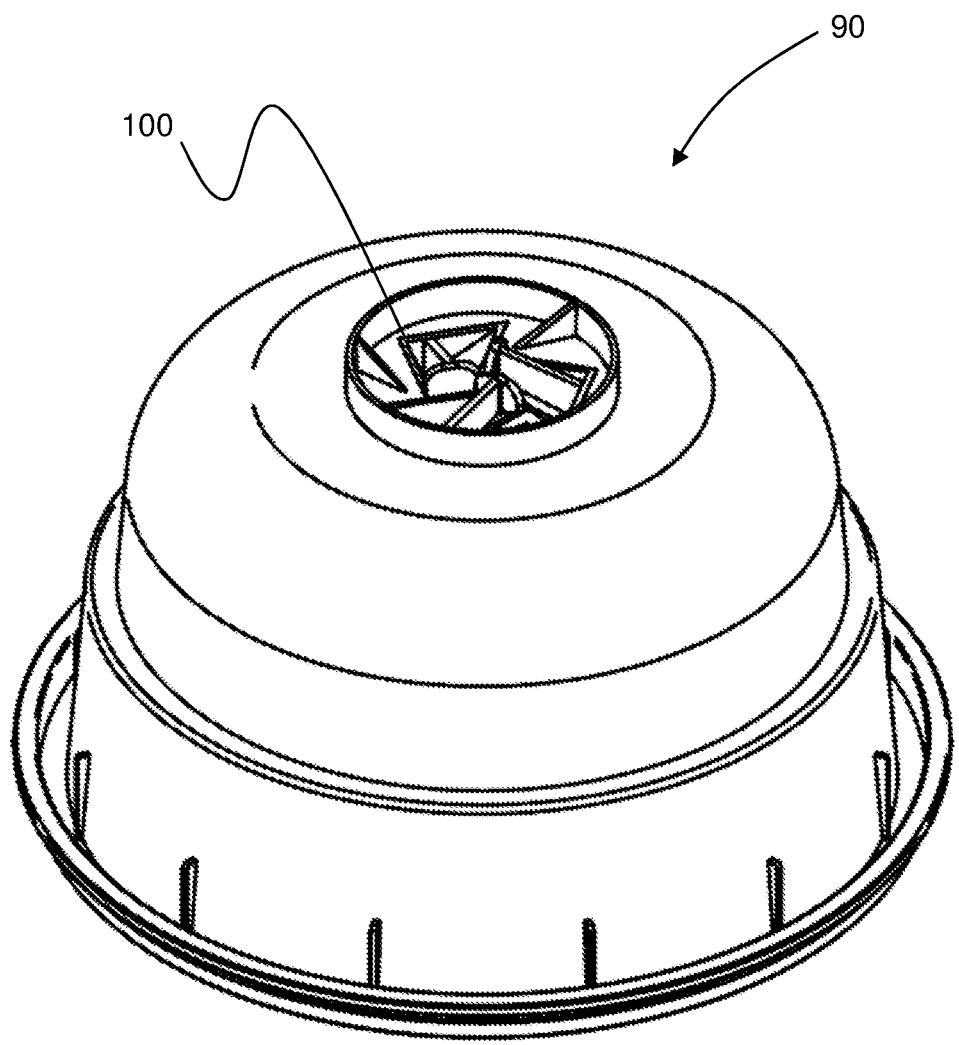
FIG. 13 is a perspective view of a container, substantially the same as the containers of FIG. 2 and FIG. 12, but with a modified outlet.
Figure 14:
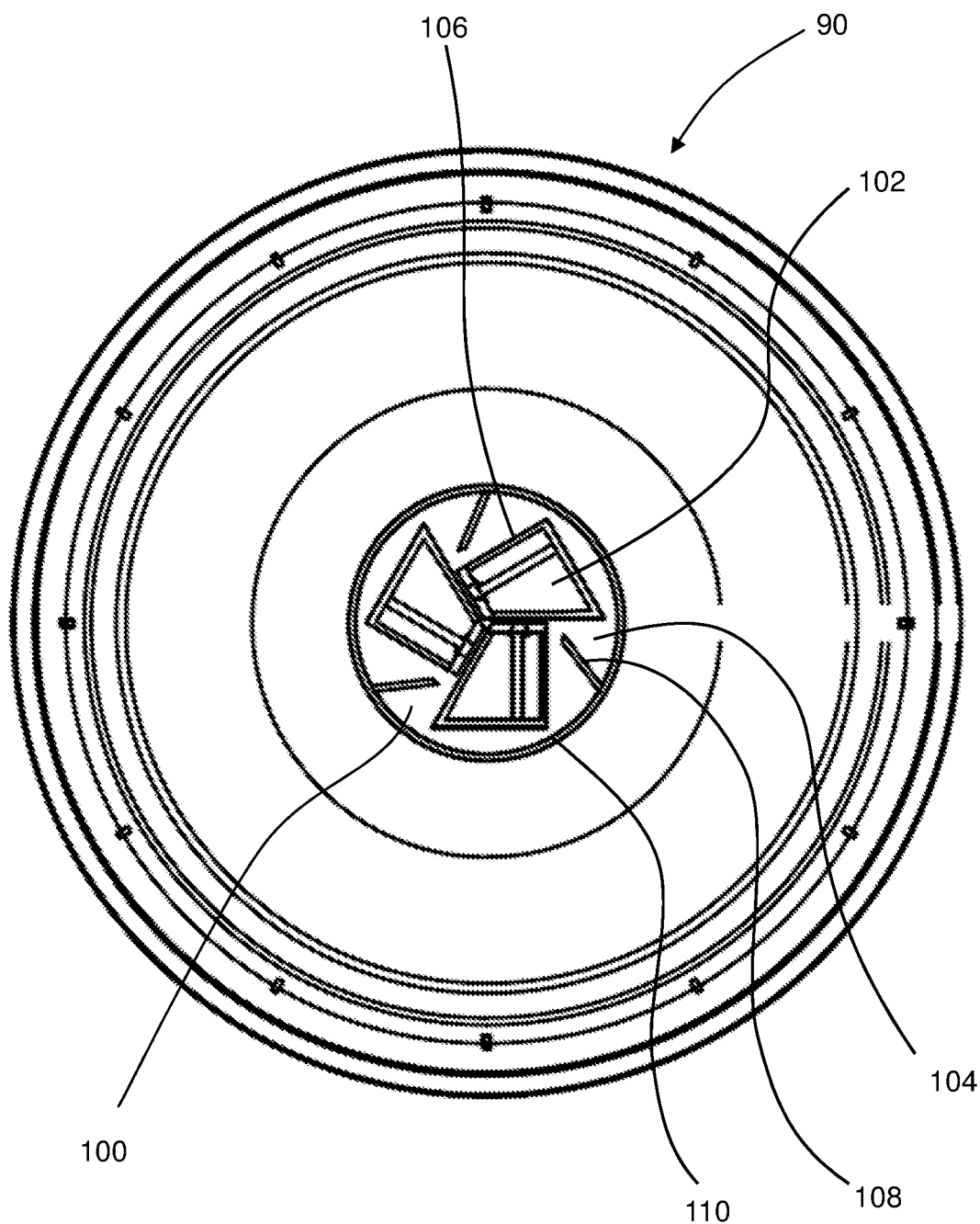
FIG. 14 shows a plan view from above the container of FIG. 13.

FIG. 13 shows a perspective view of another container 90, which is substantially the same as the container of FIG. 12, but with a modified outlet 100. FIG. 14 shows a plan view from above the container 90. It can be seen that the outlet has movable parts 102 and fixed parts 104.

A land 106 is formed between the movable parts 102. The land 106 is a membrane between the movable and fixed parts 102, 104 of a reduced material thickness, suitable to form a line of weakness capable of breaking if a sufficient force is applied to the outlet 100. Each land 106 is a continuation of a line of weakness (formed by a region of reduced material thickness) extending between the movable and fixed parts 102, 104.

To strengthen the fixed parts 104, each fixed part 104 includes a strengthening rib 108 on an underside thereof. The rib 108 extends substantially along the length of the fixed part, from an annular wall 110 (surrounding the outlet and projecting outwardly from the bottom surface of the container 90) to a location proximal (but spaced from) a free end of the fixed part. As can be seen from FIG. 14, the rib 108 extends from a point generally midway along the arc of the section of annular wall 110 at the non-free end of the fixed part and in the direction of the tip of the free end of the fixed part. The height of the rib tapers from a maximum adjacent the wall 110 to a minimum at the distal end of the rib. The maximum height of the rib may correspond to the height of the wall, for example, whereas the rib may taper to zero height as a minimum, as shown in FIG. 14. The rib 104 may be applied to any embodiment of container described herein, but is of particular advantage to those embodiments in which the movable parts are designed to break open from a closed condition.

Figure 15:
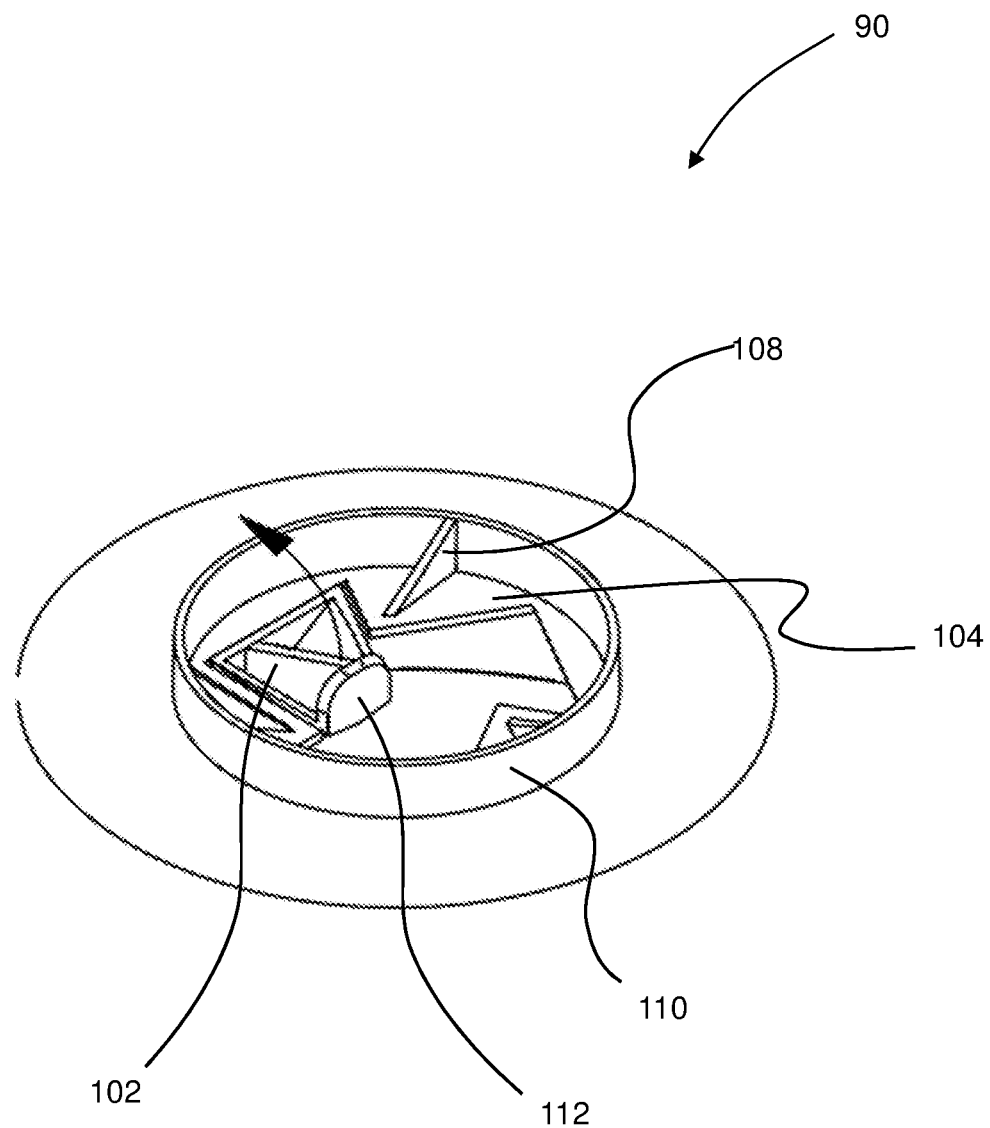
FIG. 15 shows a detailed perspective view of the outlet of the container of FIG. 13 in a closed condition, with only one movable part shown for clarity.
Figure 16:
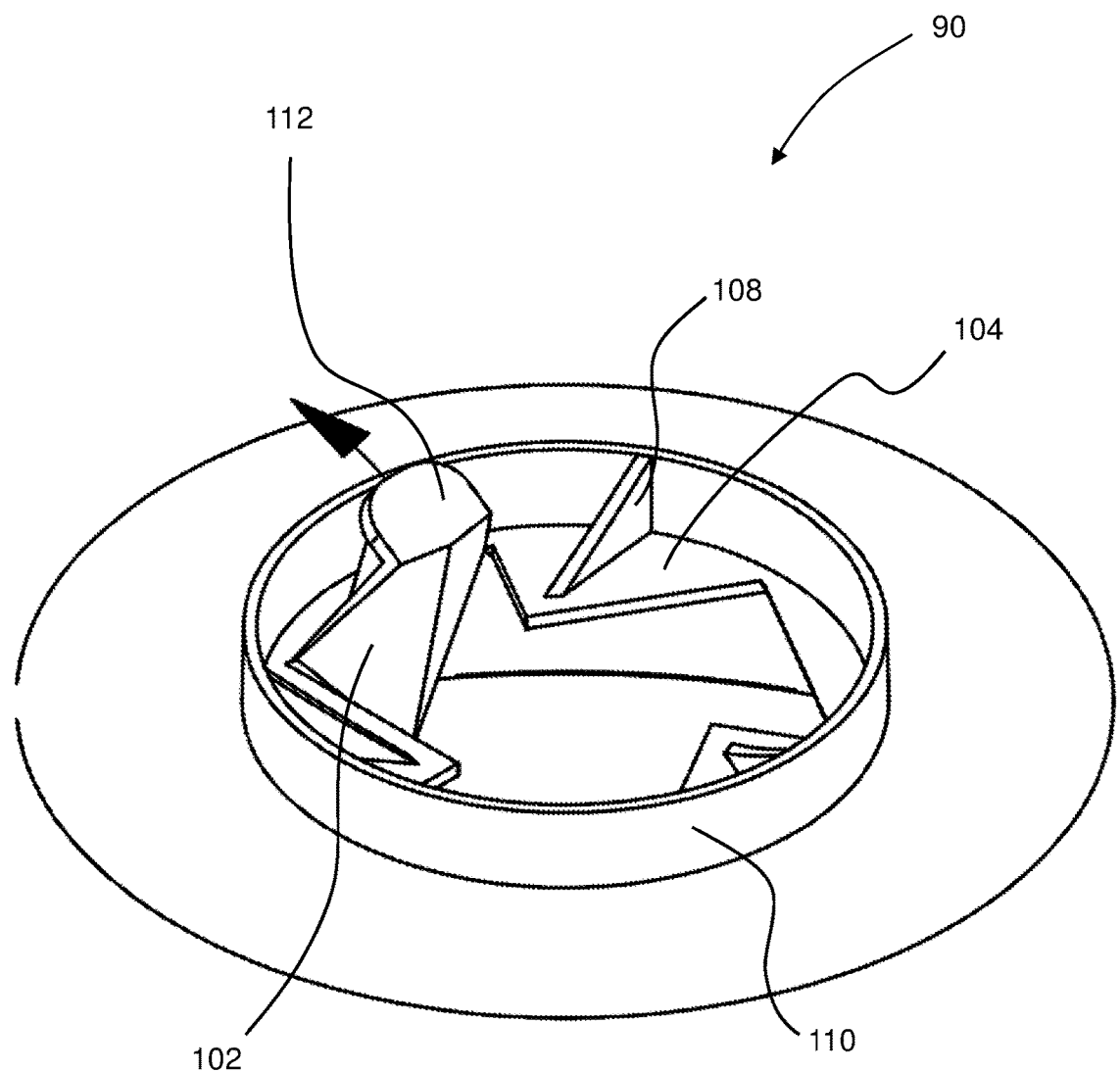
FIG. 16 shows a detailed perspective view of the outlet of the container of FIG. 13 in an open condition, with only one movable part shown for clarity.

FIG. 15 shows a detailed perspective view of the outlet 100 in a closed condition. Only one movable part 102 is shown for clarity. FIG. 16 shows a detailed perspective view of the outlet 100 an open condition, also with only one movable part 102 shown, for clarity. It can be seen that each rib 108 is triangular, with a first side projecting from the annular wall 110, a second side projecting from the underside surface of the fixed part 104, and a third side connecting the first and second sides.

Each movable part 102 is substantially the same as the movable parts 42 of the container of FIGS. 2 to 12, except with a modified end surface 112. As can be seen most clearly from FIGS. 15 and 16, the end surface 112 is substantially semi-circular, and projects outwardly to a greater extent than the end surface 56 of the containers of FIGS. 2 to 12.

The outlet 100 is moulded in a closed condition and the land 106 is capable of being broken open prior to a dispensing operation (described in more detail below), in order to free the movable parts 102 to move outwardly from the container 90 under pressure from the extrusion of product, to adopt an open configuration as shown in FIG. 16. It can be seen how the provision of the ribs 108 can help to reduce the risk of the fixed parts 104 also breaking when the land 106 is broken prior to a dispensing operation.

Although particularly suited for a frozen confection, e.g. ice cream, sorbet, frozen yoghurt, the outlet configuration of a plurality of movable and fixed parts shown and described herein could be used with a range of different types of container, provided that the container is of a kind intended for use with a force applied to the container in order to extrude product through the outlet.

Figure 17A:
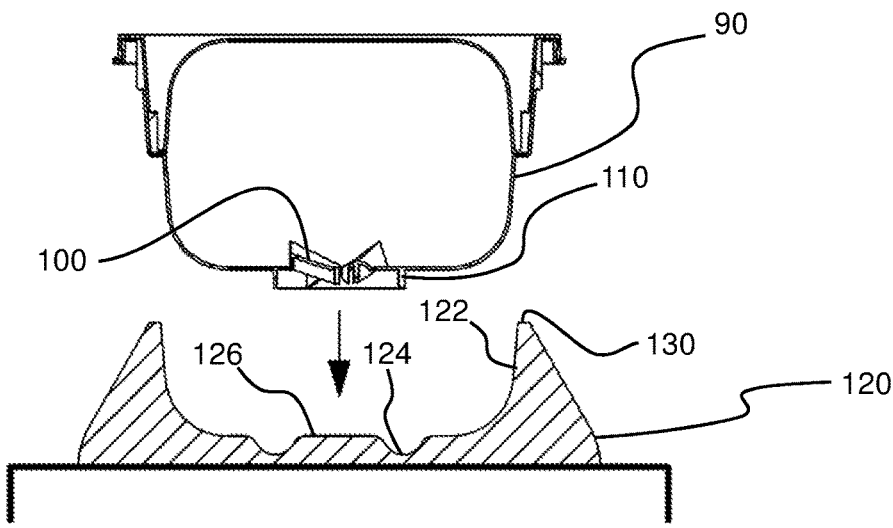
FIGS. 17*a* to 17*c* show a method of breaking the land of the container of FIG. 13 in order to free the outlet to move to an open condition.
Figure 17B:
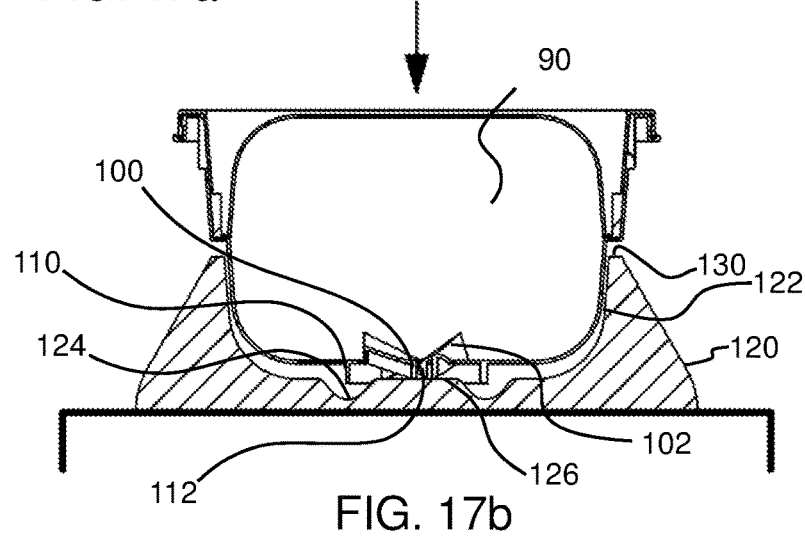
Figure 17C:
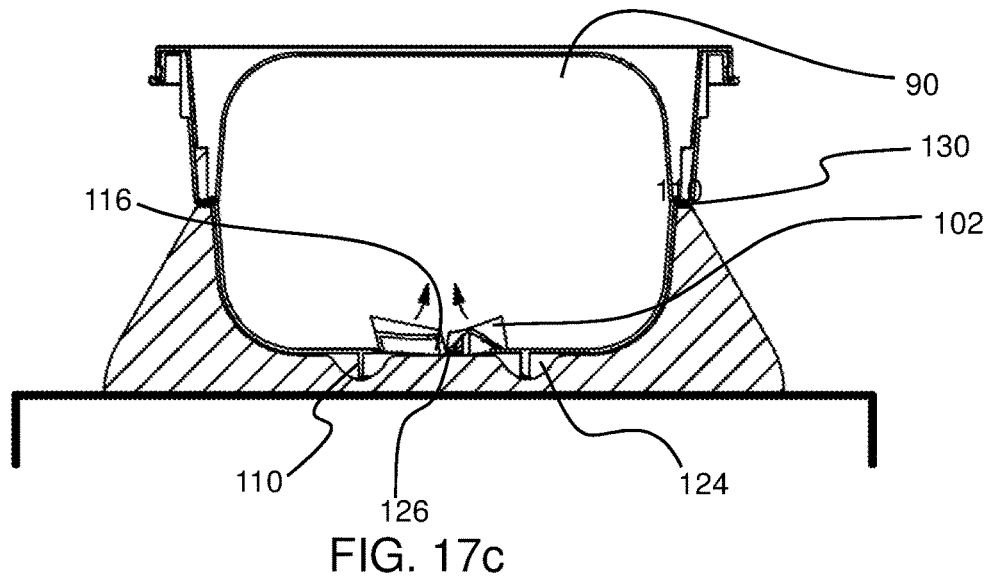

FIGS. 17a to 17c show a method of breaking the land 106 of the container 90 in order to free the movable parts to move to an open condition. A mechanism 120 is shown in cross-section, suitable for causing the breaking of the land 106. The mechanism 120 includes a cup-shaped recess 122 that generally corresponds to the outer surface of the lower part of the container 90. The recess 122 includes a groove 124 in a bottom surface. The groove 124 is annular and located centrally of the recess, in order to correspond to the position of the annular wall 110 of the container 90, such that the wall 110 can project into the groove 124 when the container is located in the recess (described in more detail below). The groove 124 defines a projection 126, inboard of the groove 124. The upper end of the recess defines a shoulder 130.

Looking at FIG. 17a, to operate the mechanism 120, firstly the container 90 is placed in the recess 122. A force is applied to a top surface of the container 90 as shown in FIG. 17b, causing the container to move downwardly into the recess 122, whereupon the annular wall 110 moves into the groove 124. This causes the outlet 100 to be brought into engagement with the projection 126, causing the movable parts 102 to move inwardly, breaking the land 106 (see FIG. 17c). The lid of the container engages the shoulder 130, limiting movement of the container and, more specifically, the movable parts 102, to reduce the risk of them breaking off. The container 90 can then be removed from the mechanism 120, whereupon the outlet 100 is free to move to the open condition.

Alternatively, although not shown in the Figures, the land 106 of the container 90 could be broken in a different way. For example, the container 90 could be simply secured in a ring-type seating before a surface of an actuating member is made to engage the outlet 100, applying a force to break the land 106. The outlet of the container could also be pushed into engagement with some other form of projection dimensioned to allow the movable parts to flex inwardly and cause fracture of the land 106.

Figure 18A:
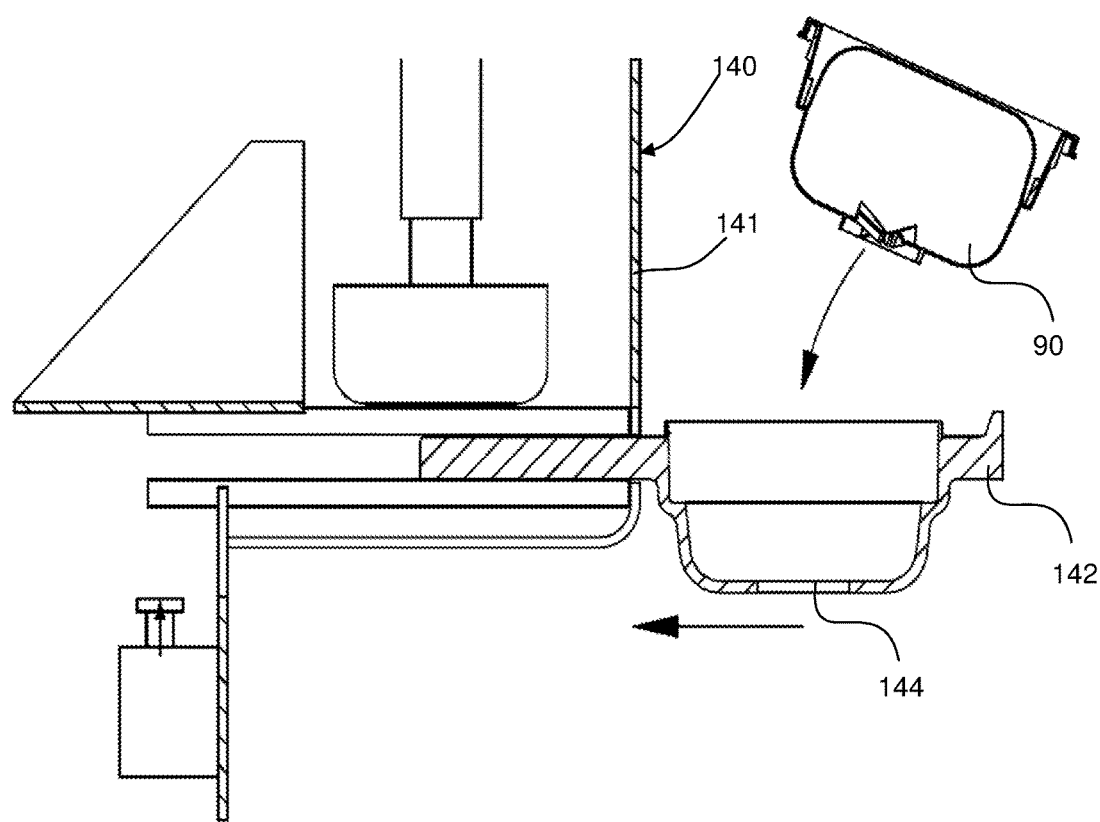
FIGS. 18*a* to 18*d* show a method of performing a dispensing operation using the container of FIG. 13.

FIGS. 18a to 18d show a method of performing a dispensing operation using the container 90 of FIGS. 13 and 14. FIG. 18a shows a dispensing apparatus 140 in a first condition, for receiving a container 90. It can be seen that a seating 142 is provided for accepting the container 90. It is shaped to generally correspond to the external profile of the underside of the container 90, but includes an aperture 144 at a bottom end, such that when the container 90 is seated, the outlet 100 is exposed. The seating 142 is movable relative to the body 141 of the apparatus. This can be achieved by providing the apparatus 140 with an actuating member in communication with the seating 142 to move it between different positions (the different positions are described in more detail below), or by providing the apparatus 140 with a rotating member to translate the container 90 between different positions. In use, a container 90 is inserted into the seating 142 when the seating is at a first position, such that the outlet 100 is located within the aperture 144 of the seating 142. The seating 142 is subsequently moved to a second position relative to the body 143 of the apparatus, shown in FIG. 18b.

Figure 18B:
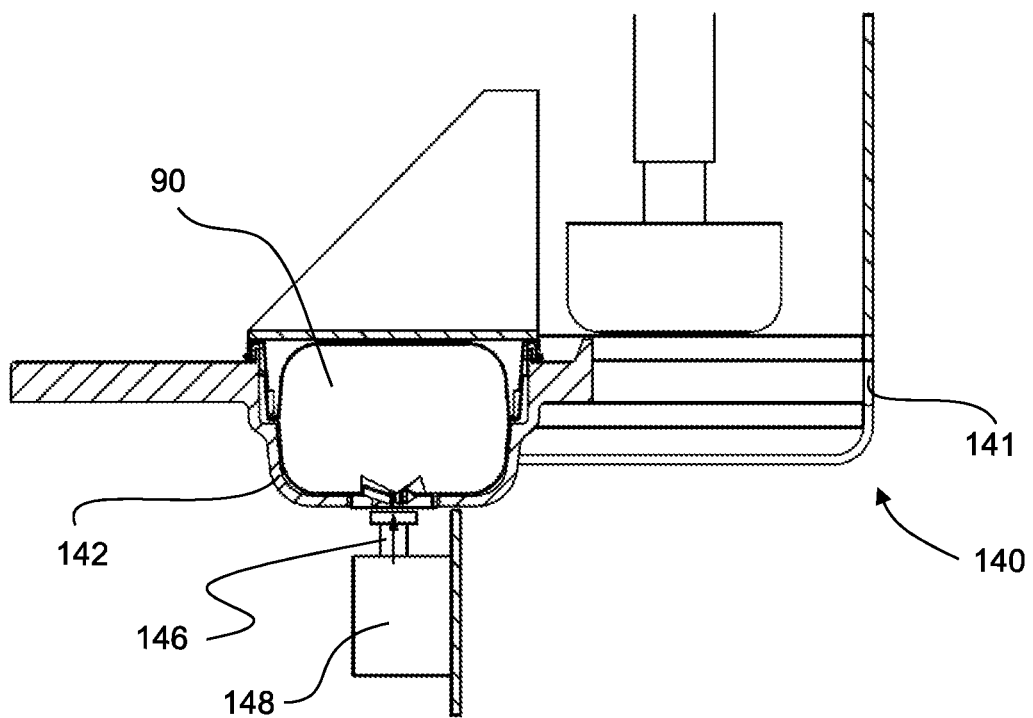

FIG. 18b shows the apparatus 140 in a second condition, for breaking the land 106 of the container 90, to enable the movable parts 102 to move to an open condition. It can be seen that the seating 142 has been moved to a second position relative to the body 143, from right to left along the body 141 of the apparatus 142 in FIG. 18b. At this position of the seating 142, the aperture 144 of the seating 142 is located adjacent an actuating member 146 of a breaker mechanism 148. Therefore, the actuating member 146 can be moved, in use, to engage the outlet 100 of the container 90 in the seating 142. The force of the actuating member 146 acting on the outlet 100 breaks the land 106.

Figure 18C:
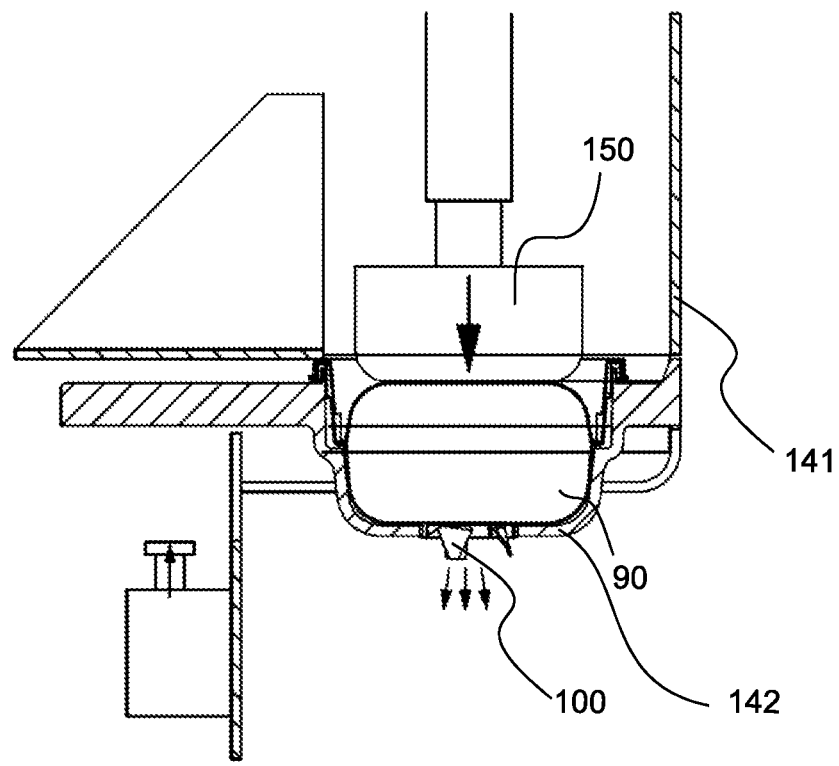

FIG. 18c shows the apparatus 140 in a third condition, after the land 106 is broken, for dispensing product from the container 90. It can be seen that the seating 142 has been moved to third position relative to the body 141. The third position is intermediate the first and second positions of the seating 142, e.g. in the centre of the apparatus as shown in FIGS. 18a-d. The apparatus 140 includes a dispensing head 150, arranged to engage the top surface of the container 90 in use. The dispensing head 150 is a piston or other actuating part that can apply a force to the top surface of the container 90 during a dispensing operation, compressing the upper part of the container 90 and increasing the pressure within the container 90. In use, when the pressure within the container 90 reaches a predetermined level, the movable parts 102 of the outlet 100 pivot outwardly from the container 90, and product is extruded through the outlet 100.

Figure 18D:
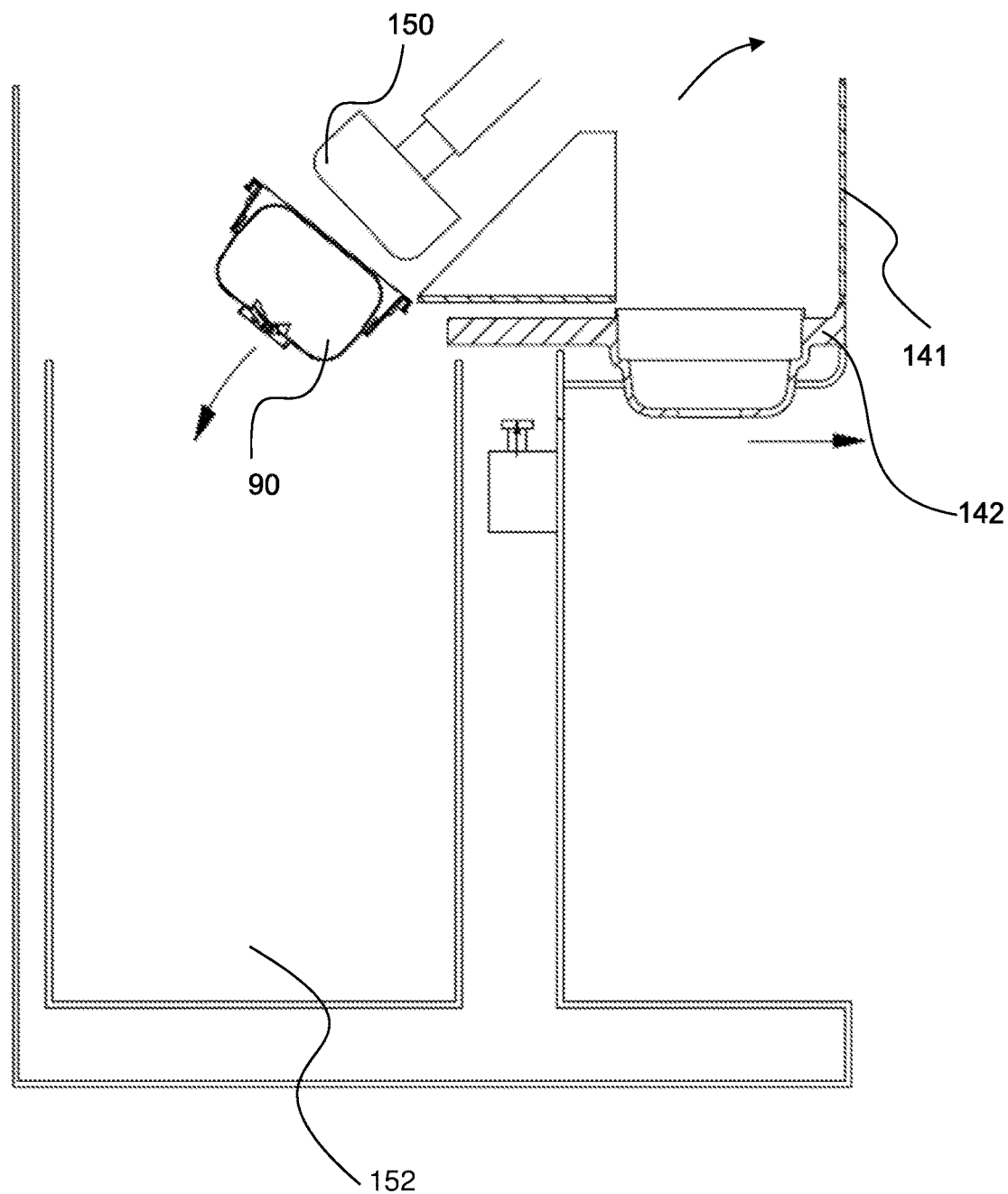

FIG. 18d shows the apparatus 140 in a fourth condition, for disposing of the container 90 after a dispensing operation. In this condition, the seating 142 remains in the third position. The container 90 is picked up by the dispensing head 150 (e.g. via a suction device), and translated to a disposal area 152 of the apparatus 140, where it is released. Alternatively, a separate mechanism may pick up the container 90 after a dispensing operation and move it to the disposal area 152. The disposal area 152 is located on the left side of the apparatus as shown in FIG. 18d, but may be located in another part of the apparatus, for example the rear of the apparatus 140. The depleted containers 90 are stored in the disposal area 152 of the apparatus 140, but alternatively they may be ejected from the apparatus 140 to be stored elsewhere.

Figure 19:
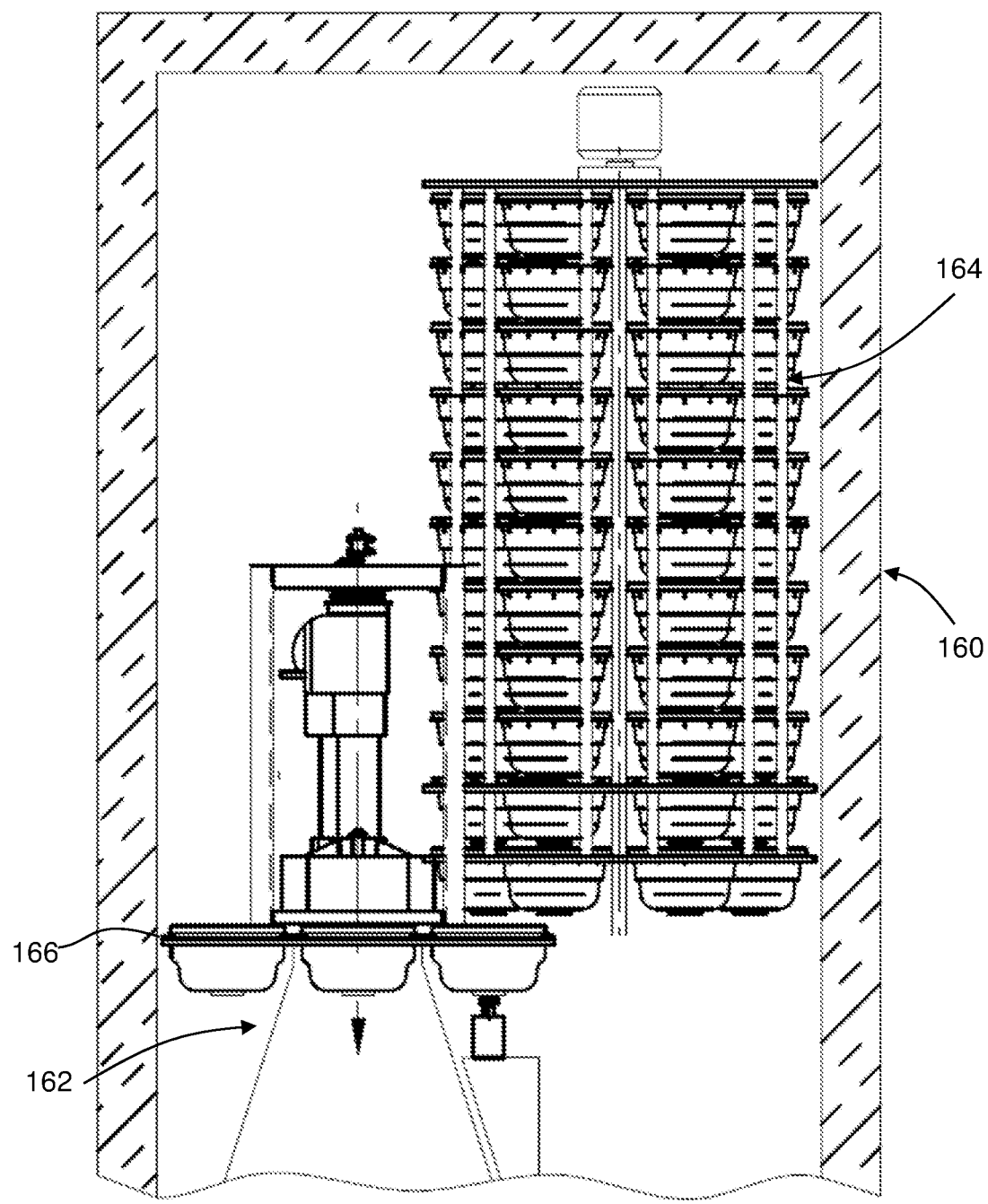
FIG. 19 is a cut-away front view of a vending machine for dispensing portions of ice cream or other frozen confection from the container of FIG. 13.
Figure 20:
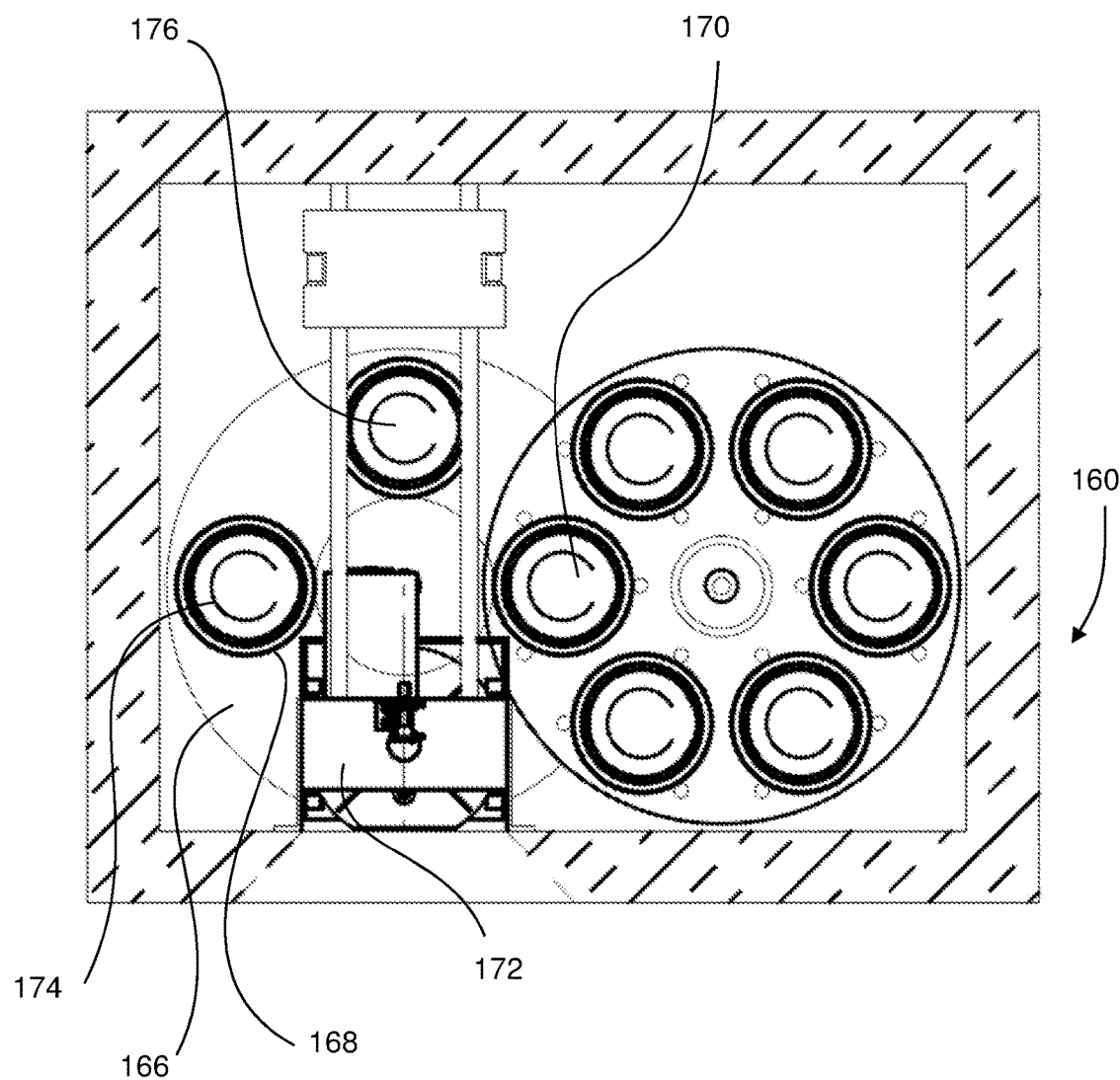
FIG. 20 shows a cut-away plan view of the vending machine of FIG. 19.

FIGS. 19 and 20 show a vending machine 160 for dispensing portions of ice cream or other frozen confection from the container 90 of FIGS. 13 and 14. FIG. 19 is a cut-away front view of the machine. The vending machine has a dispensing area 162 where product is dispensed from the containers 90, and a storage area 164 where containers containing product are stored.

FIG. 20 shows a cut-away plan view of the vending machine 160. In the dispensing area 162, is a rotatable drum 166. The drum contains four apertures 168, distributed evenly around the drum 166, each aperture 168 being suitable for seating the container 90. The apertures 168 are circular but could be any suitable shape for housing the container 90. In use, a container 90 is seated in an aperture 168 of the drum 168 at a first location 170. A breaker mechanism 148 is located at the first location, for breaking the land 106 of the outlet 100 of the container 90, as described in more detail above. Therefore, in use, the container 90 is seated in an aperture 168 of the drum at the first location to be secured in place subsequent to the actuating member 146 of the breaker mechanism 148 engaging the outlet of the container to break the land 106.

The drum 166 is then rotated by 90 degrees in order to move the container 90 from the first location 170 to a second location 172, where a dispensing head 150 applies a force to the container 90, dispensing product as described in more detail above.

The drum is then rotated by another 90 degrees in order to move the container 90 from the second location 172 to a third location 174, before the drum is rotated another 90 degrees in order to move the container 90 from the third location 174 to a fourth location 176. At the fourth location 176, the depleted container 90 is disposed of.

The storage area 164 includes a magazine 180 of containers 90 containing product, to be used to refill the aperture 168 at the first location 170 after every time the drum 166 rotates. The magazine 180 is a rotatable carousel and includes six stacks 182 of containers 90. Each stack is arranged vertically and includes multiple containers 90. When a container 90 is removed from a stack 182, the remaining containers 90 fall downwardly under gravity to take the place of the removed container 90. The magazine 180 is arranged such that the bottommost container 90 of one stack 182 is located adjacent the first location 170. Therefore, in use, a container 90 can be transferred from the magazine 180 to the drum 166. This can be achieved with a suction mechanism or other mechanical release (not shown). When a stack 182 is depleted, the magazine 180 can rotate to present another stack. Therefore, at least one stack is always coaxial with the aperture 168 at the first location 170.

In exemplary embodiments, the vending machine 160 includes a user interface (e.g. of the kind indicated generally at 200 in FIG. 1) for a user to select product to be dispensed. The vending machine will further include a processor (illustrated figuratively by the box 202 of FIG. 1, though it will be appreciated that the processor 202 may be located either within the vending machine or external of it) configured for automating a dispensing operation according to a user selection via said user interface 200. For each user selection, a container 90 of product will be delivered from said storage location 164, said breaker mechanism 148 will then be used to break the outlet land 106, before the dispensing head 150 is used to apply a load to the container 90 in order to dispense product from said outlet 100. As described above, the container 90 may then be disposed of. The vending machine 160 may include a mechanism for receiving payment (not shown) in order to authorise a dispensing operation according to a user selection, e.g. for receiving coins, monetary notes, tokens, credit or debit card payment or other known forms of payment.

Alternatively, one or more of the mechanisms described herein may be incorporated into a dispensing apparatus (as opposed to a vending machine) configured for manual operation rather than a wholly automated process based on a user selection and or user payment to the machine. For example, the dispensing apparatus may include a seating for receiving a container of the kind described herein and having a land 106 between fixed and movable parts of the outlet 100 (i.e. intended to be broken prior to a dispensing operation), wherein the apparatus includes a breaker mechanism 148 and a dispensing head 150, such that a container as set forth can be placed in the seating, and wherein, in response to a human operator command (e.g. made via a button or other suitable user interface on the apparatus), the breaker mechanism 148 will act to break the land 106, before the dispensing head 150 acts on the container to express product through the outlet. The apparatus may be of a kind where the container needs to be placed in the seating by a human operator, or may be of a kind including a storage area provided with a stock of sealed containers of the kind set forth, which can be automatically delivered to or stored in an appropriate seating forming part of the apparatus, for use in a dispensing operation in response to a human operator command.

The invention claimed is:

1. A container for product to be dispensed, the container having an upper part intended to move or deform in order to reduce the volume within the container, the container having an outlet intended to open during movement or deformation of said upper part, wherein the outlet comprises a plurality of movable parts and a plurality of fixed parts located between said movable parts, wherein the movable and fixed parts serve to shape the product as it is dispensed through the outlet, wherein each movable part has a free end in the open condition, and two free sides extending from the free end to a hinge configured for allowing hinged movement of the movable part from a closed position to an open position, and wherein the two free sides are of unequal length, defining one long free side and one short free side.

2. The container of claim 1 wherein the long free side of one movable part is orthogonal to the short free side of an adjacent short free side.

3. The container of claim 1 wherein the free end is orthogonal to the short free side.

4. The container of claim 1 wherein the outlet has a central axis and the long free sides extend radially of said central axis.

5. The container of claim 1 wherein the outlet is defined by three movable parts and three fixed parts.

6. The container of claim 1 wherein the movable part comprises a free end and at least one side surface extending from the free end to a hinge configured for allowing movement of the movable part from a closed position to an open position, the free end comprising an end surface, wherein the end surface of a first movable part and the side surface of a second movable part are adjacent when the outlet is in a closed condition.

7. The container of claim 6 wherein the end surface is shorter than the length of the hinge.

8. The container of claim 6 wherein the end surface is shorter than the length of the side surface.

9. The container of claim 6 wherein at least a portion of the side surface of a first movable part is in abutment or proximal the end surface of a second movable part when the outlet is in a closed condition.

10. The container of claim 1 wherein the fixed parts comprise two free sides which meet at a point.

11. The container of claim 10 wherein the two free sides of the fixed parts are of unequal length, defining one long free side and one short free side.

12. The container claim 11 wherein the outlet has a central axis and the short free sides extend radially of said central axis.

13. The container of claim 1 wherein the movable parts are hingedly coupled with the container.

14. The container of claim 13 wherein the hinge has a thickened area at or adjacent one or both longitudinal ends thereof.

15. The container of claim 13 wherein the movable parts are biased towards the closed position.

16. The container of claim 1, further comprising an upper part, intended to move or deform to reduce the internal volume of the container, for increasing pressure within the container and causing the movable parts to move to the open position.

17. The container of claim 1 wherein the outlet has a moulded closed configuration.

18. The container of claim 17 wherein a line of weakness is formed between the movable and fixed parts, and configured to break open during a dispensing operation, in order to allow the movable parts to move from a closed position to an open position relative to the fixed parts.

19. A method of dispensing comprising the steps of producing the container of claim 1, moulding the container with the movable parts in an open position, displacing the movable parts to a closed position after moulding, and providing at least one locking mechanism to retain the movable parts in the closed position with a retaining force until a predetermined force is applied to the movable part.

20. The method of dispensing of claim 19 wherein the locking mechanism deforms in order to allow the movable parts to move to an open position when a predetermined pressure is reached within the container and applies the predetermined force to the movable parts.

21. A vending machine for dispensing portions of ice cream or other frozen confection from the container of claim 1, the container including a membrane between the fixed and movable parts of the outlet, the vending machine comprising:

a storage area for storing a plurality of said containers;
a dispensing location having a seating for receiving one of said stored containers from said storage area; and
a dispensing head for applying a load to the container in order to dispense product through the outlet of the container,
wherein the vending machine comprises a breaking mechanism for use in breaking a membrane at the outlet of the container prior to the application of load to the container via the dispensing head,
further wherein the vending machine comprises:
a user interface for a user to select product to be dispensed, and
a processor configured for automating a dispensing operation according to a user selection via said user interface by delivering a container of product from said storage location, using said breaking mechanism to break the outlet membrane and then using the dispensing head to apply a load to the container in order to dispense product from said outlet.

\* \* \* \* \*